United States Patent
Jaaskelainen et al.

(10) Patent No.: US 11,578,547 B2
(45) Date of Patent: Feb. 14, 2023

(54) WELLBORE FLOW MONITORING USING ORIFICE PLATES IN DOWNHOLE COMPLETIONS

(71) Applicant: Halliburton Energy Services, Inc., Houston, TX (US)

(72) Inventors: Mikko K. Jaaskelainen, Houston, TX (US); Cole Aaron Grandjean, Santa Fe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 211 days.

(21) Appl. No.: 17/154,904

(22) Filed: Jan. 21, 2021

(65) Prior Publication Data

US 2022/0228451 A1  Jul. 21, 2022

(51) Int. Cl.
*G01F 15/06* (2022.01)
*E21B 21/08* (2006.01)
*E21B 33/12* (2006.01)

(52) U.S. Cl.
CPC .............. *E21B 21/08* (2013.01); *E21B 33/12* (2013.01); *G01F 15/06* (2013.01)

(58) Field of Classification Search
None
See application file for complete search history.

(56) References Cited

U.S. PATENT DOCUMENTS

| | | | | |
|---|---|---|---|---|
| 10,227,841 | B2* | 3/2019 | Fripp | E21B 33/13 |
| 10,287,854 | B2* | 5/2019 | Jaaskelainen | H02N 2/18 |
| 10,626,718 | B2* | 4/2020 | Jaaskelainen | G01F 15/18 |
| 10,767,439 | B1* | 9/2020 | Rosenholm | C08L 29/04 |
| 2018/0230770 | A1* | 8/2018 | Oag | E21B 34/063 |
| 2019/0369276 | A1* | 12/2019 | Barfoot | G01V 1/308 |
| 2020/0032602 | A1* | 1/2020 | Jennings | E21B 43/116 |
| 2022/0090947 | A1* | 3/2022 | Gamber | G01F 1/44 |

OTHER PUBLICATIONS

Ünalmis, et al., "In-Well, Optical, Strain-Based Flow Measurement Technology and Its Applications", Paper presented at the SPE Europec/EAGE Annual Conference, Copenhagen, Denmark, Jun. 2012, 18 pages.

(Continued)

*Primary Examiner* — Lisa M Caputo
*Assistant Examiner* — Nigel H Plumb
(74) *Attorney, Agent, or Firm* — Delizio, Peacock, Lewin & Guerra

(57) ABSTRACT

Some embodiments of the inventive subject matter improve techniques for measuring downhole attributes. A method for determining a flow rate of a fluid includes positioning a tubular within a wellbore formed in a subsurface formation, wherein a flow of fluid is to move through the tubular. An orifice plate is positioned in the tubular. The orifice plate is movable between a first position and a second position to alter a flow area of the flow of fluid moving through the tubular. The method includes detecting a change in a downhole attribute that changes in response to the alteration of the flow area of the flow of fluid. Sensors positioned within or in communication with an interior of the tubular can detect the change in the downhole attribute. The method further includes determining a flow rate of the flow of fluid based on the detected change in the downhole attribute.

20 Claims, 15 Drawing Sheets

(56) References Cited

OTHER PUBLICATIONS

"U.S. Appl. No. 17/154,837, Non-Final Office Action", dated Mar. 30, 2022, 10 pages.
"CA Application No. 3110368 Office Action", dated Jul. 26, 2022, 4 pages.
"U.S. Appl. No. 17/154,837, Final Office Action", dated Oct. 12, 2022, 14 pages.

\* cited by examiner

WELLBORE FLOW MONITORING USING ORIFICE PLATES IN DOWNHOLE COMPLETIONS

BACKGROUND

The disclosure generally relates to surveying of wellbores and more specifically to controlling fluid flow through a casing of the wellbore.

In hydrocarbon recovery operations from a wellbore, monitoring where hydrocarbons are being produced within the wellbore can be important in order to maximize hydrocarbon recovery. Downhole fiber optic sensors and/or other distributed sensing systems can be used to provide such monitoring. For example, fiber optic sensing can provide distributed and/or multi-point sensing to provide for monitoring flows in the wellbore.

However, there can be many challenges to subsurface production monitoring. For example, such challenges can include a wide range of production rates, varying pressure profiles along a wellbore, low flow contributions per unit length of long horizontal wells, and slowly changing flow rates over time. Further, many of these challenges can lead to laminar fluid flow throughout the wellbore, leading to difficulties in monitoring flow related properties. Additionally, unconventional wells may have high initial production rates with rapidly declining production rates. For example, a well may initially produce 500-1000 barrels per day (bpd), but over time the production rate may decrease substantially (e.g., to 10-100 bpd). In hydrocarbon recovery operations having low production rates, energy, flow disturbances, eddy currents, or any other indication of flow can be difficult to measure due to a low signal amplitude.

BRIEF DESCRIPTION OF THE DRAWINGS

Embodiments of the disclosure may be better understood by referencing the accompanying drawings.

DESCRIPTION

Figure 1:
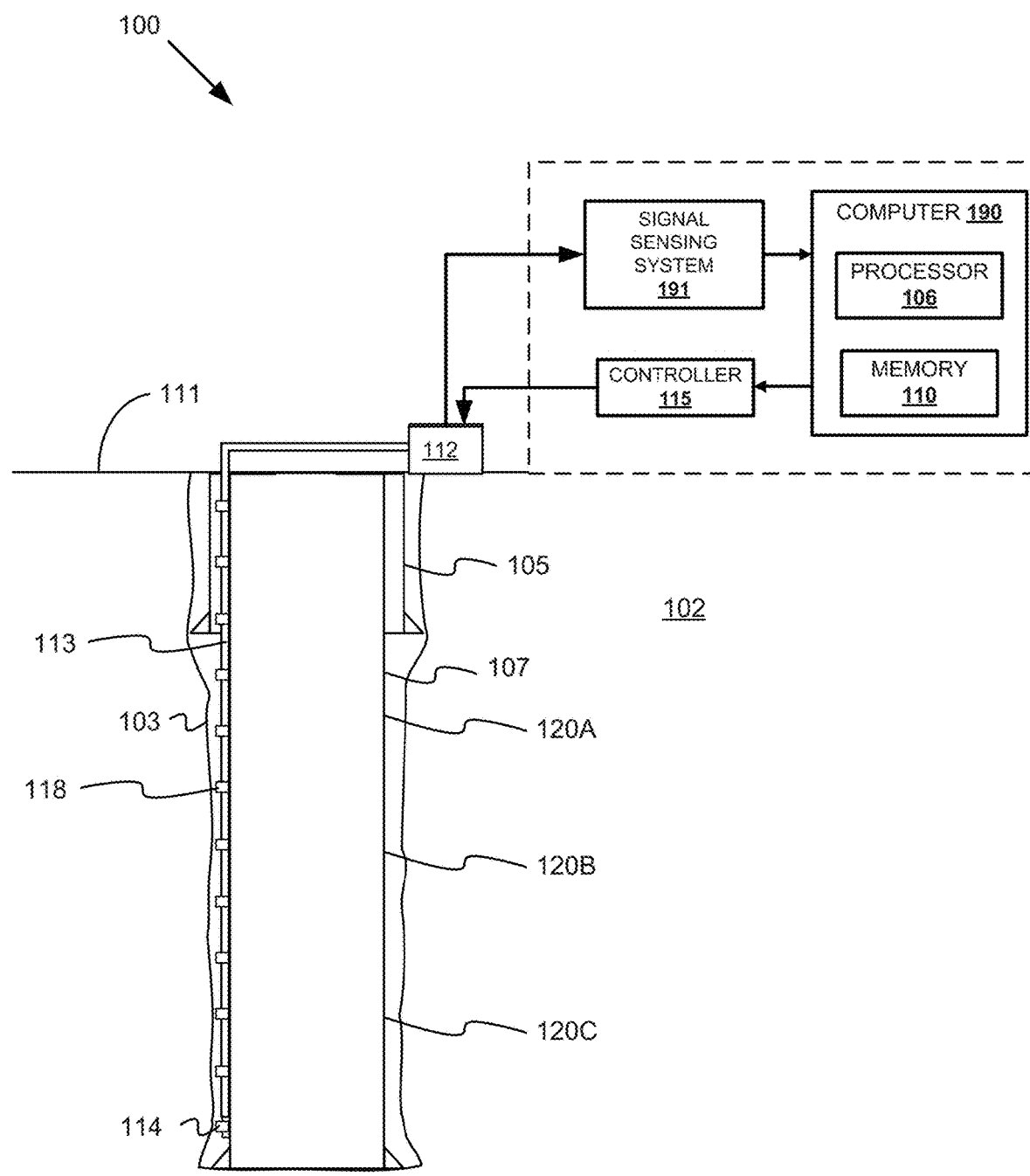
FIG. 1 depicts an example well system including a distributed sensing system, according to some embodiments.

The description that follows includes example systems, methods, techniques, and program flows that embody aspects of the disclosure. However, it is understood that this disclosure may be practiced without these specific details. For instance, this disclosure refers to hydrocarbon recovery in vertical and horizontal wellbores in illustrative examples. Aspects of this disclosure can be also applied to hydrocarbon recovery in intersecting and/or angled wellbores. In other instances, well-known instruction instances, protocols, structures, and techniques have not been shown in detail in order not to obfuscate the description.

Fiber optic sensing systems for monitoring formation fluid properties within a wellbore can include a fiber optic cable positioned along a length of the wellbore and one or more types of sensors distributed along the optical fiber. Fiber optic sensing systems can include one or more of a distributed temperature sensing (DTS) system, a distributed acoustic sensing (DAS) system, a distributed strain sensing (DSS) system, quasi-distributed sensing systems, and single point sensing systems. In some embodiments, a flow of a fluid through a casing of the wellbore can generate acoustic noise to be detected by a sensor of a DAS system, where the detection of the acoustic noise by the sensor induces a change in a property of the optical fiber, which can be used to determine a flow rate of the fluid.

In some embodiments, a flow area of the flow of fluid through the casing can be altered using an orifice plate to generate a detectable change in a downhole attribute (e.g., a property of the flow). In some embodiments, at least a portion of an orifice plate can be positioned within a recess of a casing of a wellbore and, after a period of time, the orifice plate can be deployed into an interior of the casing and into a flow stream of a fluid once the wellbore is in production. Deployment of the orifice plate into the flow stream can alter the flow area of the fluid flow as the fluid is forced to flow through hole(s) of the orifice plate.

In some embodiments, the orifice plate may be secured within the recess of the casing using a dissolvable material. The dissolvable material can be selected to dissolve after a desired period of time or once the well is in production. The dissolvable material can dissolve in response to being in the downhole ambient environment and/or the flow of fluid. For example, high temperature and pressure downhole in combination with the flow of fluid in the wellbore can cause dissolving of the dissolvable material. Once the dissolvable material has dissolved, the orifice plate can be deployed into the flow stream. In some embodiments, after the dissolvable material is dissolved, the orifice plate can be deployed from the recess in the casing and into the flow stream using gravity, a spring, and/or a swellable polymer.

In some other embodiments, there is no need to move an orifice plate into the flow of the fluid from a recess of the casing. Rather, the orifice plate may be positioned in the wellbore prior to the flow of the fluid. Such an orifice plate can include an open configuration and a closed configuration. The orifice plate can be movable between the open configuration (where the flow area is unaltered by the orifice plate), and a closed configuration (where the flow area is altered by the orifice plate). The orifice plate can be moved between the open and closed configurations by deploying a downhole tool through the casing. For example, the orifice plate can be moved to the open position by deploying a coiled tubing tool downhole.

While described in the alternative, in some embodiments, these two orifice plate examples can be used together. For example, a wellbore can use one or more orifice plates moving from a recess in the casing into the flow of fluid as well as one or more orifice plates with the open and closed configurations. Additionally, multiple orifice plates (the same or different examples) can be positioned at a same position in the wellbore. For example, multiple orifice plates may be included in one location such that the first orifice plate is selected for a certain expected flow rate based on location along the wellbore and expected flow through that location of the wellbore for a given time. Subsequent orifice plates may be released at some predicted time based on one or more of material selection of the dissolvable material, swellable materials that would exert a suitable force after a given exposure to temperature, wellbore fluids etc. The subsequent orifice plates may have a smaller orifice to match a future production rate as unconventional wells may have an initial production rate of 700-1,000 bpd, and the production rate 12 months later may be an order of magnitude less than the initial production. The orifice size needs to be matched with a given flow rate for accurate measurements, and different plate sizes may be selected for the different locations along the wellbore.

In some embodiments, a flow rate of the fluid can be determined based on measurements from sensors positioned throughout the wellbore. Downhole sensors can detect a change in one or more downhole attributes that change in response to the alteration of the fluid flow area. For example, pressure sensors can be positioned uphole and downhole of the orifice plate to measure a change in pressure induced by the alteration of the fluid flow area. In some embodiments, the pressure sensors may be included in an electro-acoustic technology (EAT) sensing module configured to acoustically transmit the pressure measurements to an optical fiber for transmission uphole.

Example Well System

FIG. 1 depicts an example well system including a distributed sensing system, according to some embodiments. An example well system 100 includes a signal sensing system 191, an interrogator 112, and a fiber optic cable 113 to measure downhole attributes within a wellbore 103 in a subterranean formation 102. The wellbore 103 is depicted as a completion well (i.e. a well ready for production or injection following a drilling process) having a surface casing 105 and a production casing 107 inside the surface casing 105. In some embodiments, the wellbore 103 may be producing and coupled to production or injection equipment (not shown) at the surface 111 of the wellbore 103.

Three sensors (sensors 120A-C) are depicted along the production casing 107. However, there can be a lesser or greater number of such sensors and such sensors can be located at any position in the wellbore 103. The sensors 120A-C can measure a downhole attribute that changes in response to an alteration of a fluid flow area through the production casing 107 caused by introducing an orifice plate into a path of the fluid flow (as further described below). The sensors 120A-C can be acoustic sensors, pressure sensors, strain sensors, resistivity sensors, density sensors, temperature sensors, electro-acoustic technology (EAT) sensors, or any other sensor or combination of sensors to measure downhole attributes. Example EAT sensors for flow monitoring are described in more detail below in reference to FIGS. 9-11.

One or more orifice plates (not shown in FIG. 1) can be positioned in the wellbore 103 to alter the flow area to allow for monitoring of the rate of the flow (as further described below). For example, orifice plates can be positioned within the production casing 107 and then deployed into an interior of the production casing 107 to alter the fluid flow area. In some embodiments, sensors can be positioned uphole (closer to the surface 111) and downhole (further from the surface 111) of the orifice plate and can detect a change in a downhole attribute between two locations in the wellbore 103 in response to altering the fluid flow area. For example, an orifice plate can be located between the sensor 120A and 120B, and the sensors 120A and 120B can be pressure sensors to measure a change in pressure in the fluid flow between a location downhole of the orifice plate, using sensor 120B, and uphole of the orifice plate, using sensor 120A. Alternatively or in addition, one sensor may be used to detect a change in a downhole attribute at a location of the wellbore 103 in response to the alteration of the fluid flow area by an orifice plate. For example, the sensor 120C can be an acoustic sensor to measure a change in acoustic noise between a first point in time, before an orifice plate is deployed into the interior of the production casing 107, and a second point in time, after the orifice plate is deployed and the fluid flow uphole is altered.

Fiber optic cables, such as the fiber optic cable 113, may be coupled with one or more of the sensors 120A-C and can be used to obtain measurements from the sensors 120A-C. The fiber optic cable 113 may be part of a distributed sensing system to collect one or more of acoustic, strain, and temperature data. The data may be collected at various positions distributed along the fiber optic cable 113. For example, data may be collected every 1-3 ft along the full length of the fiber optic cable 113. In some embodiments, the sensors 120A-C can include an acoustic transmitter that can emit an acoustic signal to perturb the fiber optic cable 113 based on a sensor measurement.

FIG. 1 depicts the fiber optic cable 113 as clamped to the production casing 107 with cross coupling clamps 118. The fiber optic cable 113 may be cemented in place in an annular space between the production casing 107 of the wellbore 103 and the formation 102. In some embodiments, the fiber optic cable 113 may be included with coiled tubing, wireline, loose fiber using coiled tubing, or gravity deployed fiber coils that unwind the fiber as the coils are moved in the wellbore 103. The fiber optic cable 113 may house one or more optical fibers, and the optical fibers may be single mode fibers, multi-mode fibers, or a combination of single mode and multi-mode optical fibers. In some embodiments, the fiber optic cable 113 may include optical fiber and electrical conductors.

In some embodiments, additional point sensors, such as a point sensor 114, may be included at a downhole end of the fiber optic cable 113 to obtain measurements at a downhole end of the wellbore 103. The point sensor 114 can be an optical or an electrical sensor. The point sensor 114 can be a pressure sensor, a temperature sensor, a strain sensor, or any other sensor to measure a downhole attribute. The point sensor 114 may be based on quartz type sensors, strain gauge-based sensors, or other commonly used sensing technologies. While depicted as attached to the fiber optic cable 113 in FIG. 1, the point sensor 114 may alternatively be housed in a dedicated gauge mandrel, internally and/or externally attached to the casings 105 and 107 for downhole deployment, or deployed conventionally at a surface wellhead or flow line. In some embodiments, hybrid approaches where single point, quasi-distributed, and/or distributed fiber optic sensors are used in combination with the point sensor 114.

The sensors 120A-C can communicate data to a computer 190 through an interrogator 112 coupled to the fiber optic cable 113. The interrogator 112 can include one or more of a distributed acoustic sensing (DAS) interrogator, a distributed temperature sensing (DTS) interrogator, and a distributed strain interrogator (DSS). The computer 190 includes a processor 106 and a memory 110. The computer 190 can transmit a signal to a controller 115 that controls a light source and/or fiber stretcher and/or or phase modulators and/or variable optical attenuators and/or other optical devices of the interrogator 112 to modulate an interrogation light beam to interrogate the fiber optic cable 113.

The interrogator 112 in combination with the signal sensing system 191 may operate using various sensing principles based on a change in an optical property between an interrogation optical signal and a reflected optical signal caused by a change in a downhole attribute. Changes in optical properties of an optical signal travelling through the fiber optic cable 113 may be induced by strain, vibration, acoustic signals, and/or temperature as a result of an alteration of the fluid flow area. In some embodiments, the signal sensing system 191 can be an amplitude based sensing system. For example, the interrogator 112 can be a DTS interrogator, and the signal sensing system 191 can detect a change in an amplitude of the reflected optical signal based on Raman and/or Brillouin scattering.

In some embodiments, the signal sensing system 191 can be a phase based sensing system having distributed acoustic sensors. For example, the interrogator 112 can be a DAS interrogator operated based on interferometric sensing using homodyne or heterodyne techniques, where the signal sensing system 191 can detect a change in phase and/or intensity in the reflected optical signal based on Rayleigh scattering or coherent Rayleigh scattering. In some embodiments, multiple Fiber Bragg Gratings (FBGs) can be used to form Fabry-Perot type interferometric sensors for quasi-distributed sensing based on changes in phase and/or intensity of an optical signal. For example, the fiber optic cable 113 can include one or more FBGs to form Fabry-Perot interferometric sensors along the fiber optic cable 113, and the signal sensing system 191 can detect a change in phase and/or intensity in the reflected optical signal. Alternatively or in addition, single point fiber optic sensors can be Fabry-Perot or FBG based. For example, the point sensor 114 can be a Fabry-Perot sensor and the signal sensing system 191 can detect a change in intensity of the reflected optical signal.

In some embodiments, the signal sensing system 191 can include a distributed strain sensing system. For example, the interrogator 112 can be a DSS interrogator and one or more of the sensors 120A-C can measure static and/or dynamic strain, where the signal sensing system 191 can detect a change in wavelength of the reflected optical signal based on the reflected optical signal received by the interrogator 112 based on Brillouin scattering. In some embodiments, the signal sensing system 191 and the fiber optic cable 113 can form a quasi-distributed sensing system. For example, the fiber optic cable 113 can include one or more FBGs, where the signal sensing system 191 can detect a shift in wavelength of the reflected optical signal.

In some embodiments, the signal sensing system 191 can include a combination of one or more of amplitude based, phase based, intensity based, and/or strain based sensing systems, and the interrogator 112 can include a corresponding DAS, DTS, and/or DSS interrogator. DAS, DSS, and/or DTS systems may simultaneously operate by interrogating respective optical fibers within the fiber optic cable 113 with interrogation light beams having unique wavelengths based on wavelength division multiplexing (WDM) techniques.

Data from distributed sensing systems including acoustic sensors or transmitters can be used to determine a flow rate of a fluid as it flows through the production casing 107. For example, the sensors 120A-C can be acoustic sensors to measure acoustic noise generated by fluid flow through the casing and the interrogator 112 can be a DAS interrogator. The detected acoustic noise can then be used to determine the flow rate of the fluid based on correlations between acoustic noise and flow rate. For example, the flow rate of a formation fluid through the production casing 107 may be proportional to the acoustic noise generated by the fluid flow. In some embodiments, an acoustic transmitter of a sensor can transmit an acoustic signal that interacts with the fiber optic cable 113. For example, the sensors 120A and 120B can be pressure sensors, and an acoustic transmitter can emit an acoustic signal that induces a change in an optical property of the interrogation light beam. In some embodiments, measurements from sensors can be used to determine an energy for the flow, which can be used to determine the flow rate based on correlations between energies and known flow rates.

The distribution of sensors shown in FIG. 1 is for example purposes only. Any combination of sensor deployments described may be used. For example, a well system may include fiber optic cable deployed sensors or sensors cemented into one or more casings in a wellbore. In some embodiments, the signal sensing system 191 can include a combination of one or more of amplitude based, phase based, intensity based, and/or strain based sensing systems, and the interrogator 112 can include a corresponding DAS, DTS, and/or DSS interrogator. Optionally, multiple types of sensor deployments may be used in a single well. For example, a well system can include both sensors cemented to the casing and sensors in an interior of the casing in a single well system.

Figure 2:
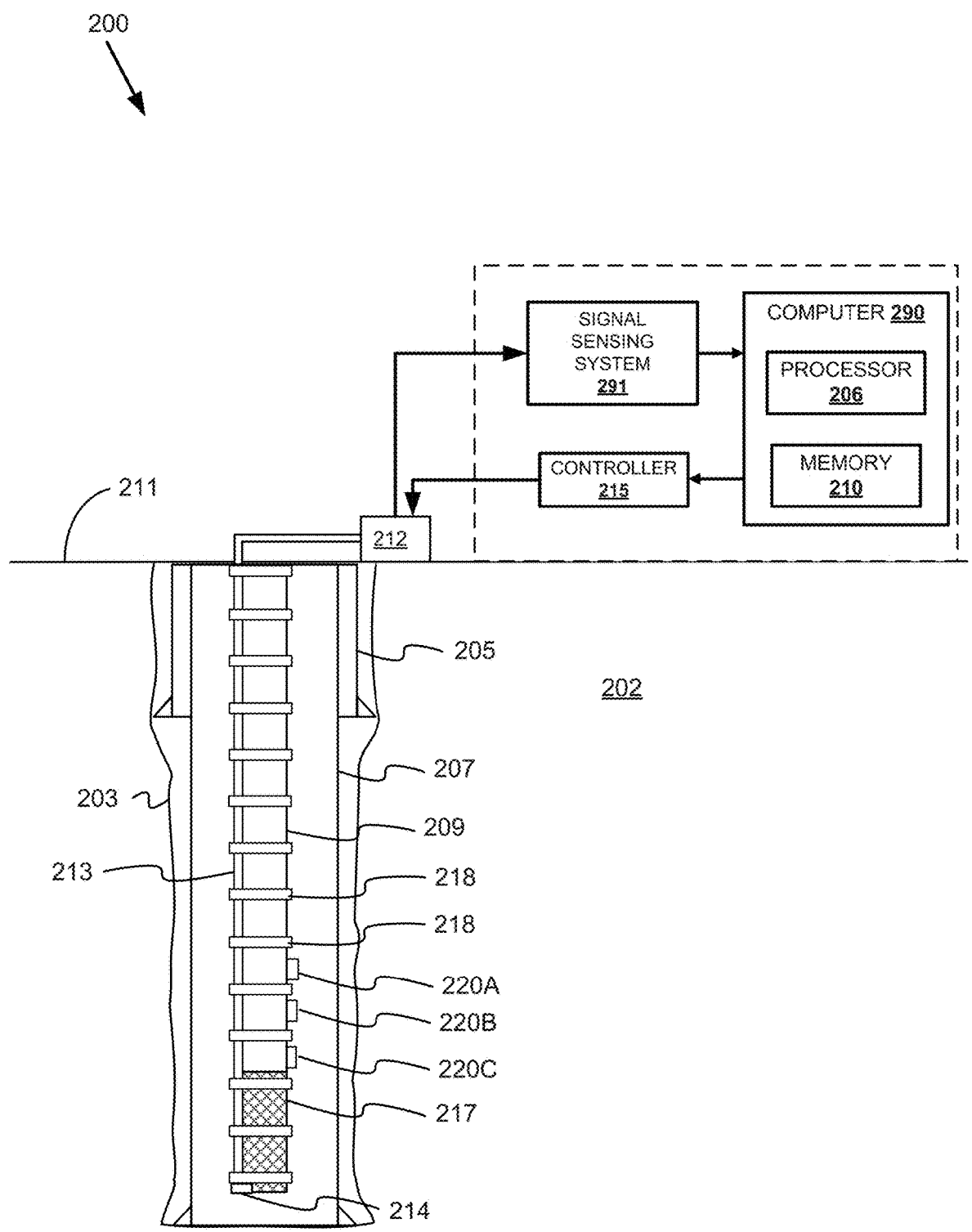
FIG. 2 depicts an example well system including a distributed sensing system and a tubing positioned within a wellbore, according to some embodiments.

FIG. 2 depicts an example well system including a distributed sensing system and a tubing positioned within a wellbore, according to some embodiments. An example well system 200 includes a signal acquisition system 291, an interrogator 212, and a fiber optic cable 213 to measure downhole attributes within a wellbore 203 in a subterranean formation 202. The wellbore 203 can be a completion well (i.e. a well ready for production or injection following a drilling process) having a surface casing 205, a production casing 207 inside the surface casing 205, and a tubing 209 inside the production casing 207. In some embodiments, the tubing 209 can be a casing string, production string, an armored wireline, a slickline, a coiled tubing, a work string, etc. Cross-coupling protectors 218 can be used to fix the fiber optic cable 213 to the tubing 209. In some embodiments, a tubing tail 217 can be fixed to the fiber optic cable 213 and extend below a downhole end of the tubing 209.

Three sensors (sensors 220A-C) are depicted along the tubing 209. However, there can be a lesser or greater number of such sensors and such sensors can be located at any position in the wellbore 203. The sensors 220A-C can measure a downhole attribute that changes in response to an alteration of a fluid flow area through the tubing 109 caused by introducing an orifice plate into a path of the fluid flow (as further described below). The sensors 220A-C can be acoustic sensors, pressure sensors, strain sensors, resistivity sensors, density sensors, temperature sensors, electro-acoustic technology (EAT) sensing modules, or any other sensor or combination of sensors to measure downhole attributes. In some embodiments, additional point sensors, such as a point sensor 214, may be included at a downhole end of the fiber optic cable 213 to obtain measurements at a downhole end of the wellbore 203.

The sensors 220A-C can communicate data to a computer 290 through an interrogator 212 coupled to the fiber optic cable 213. The interrogator 212 can include one or more of a distributed acoustic sensing (DAS) interrogator, a distributed temperature sensing (DTS) interrogator, and a distributed strain interrogator (DSS). The computer 290 includes a processor 206 and a memory 210. The computer 290 can transmit a signal to a controller 215 that controls a light source and/or fiber stretcher and/or or phase modulators and/or variable optical attenuators and/or other optical devices of the interrogator 212 to modulate an interrogation light beam to interrogate the fiber optic cable 213.

The interrogator 212 in combination with the signal sensing system 291 may operate using various sensing principles based on a change in an optical property between an interrogation optical signal and a reflected optical signal caused by a change in a downhole attribute, as previously described in reference to FIG. 1. One or more orifice plates (not shown in FIG. 2) can be positioned in the tubing 209 to alter a flow area of a fluid flow to allow for monitoring of the rate of the flow (as further described below). For example, orifice plates can be positioned within the tubing 209 and then deployed into an interior of the tubing 209 to alter the flow area.

Example Orifice Plate Configurations for Fluid Flow Monitoring

Figure 3A:
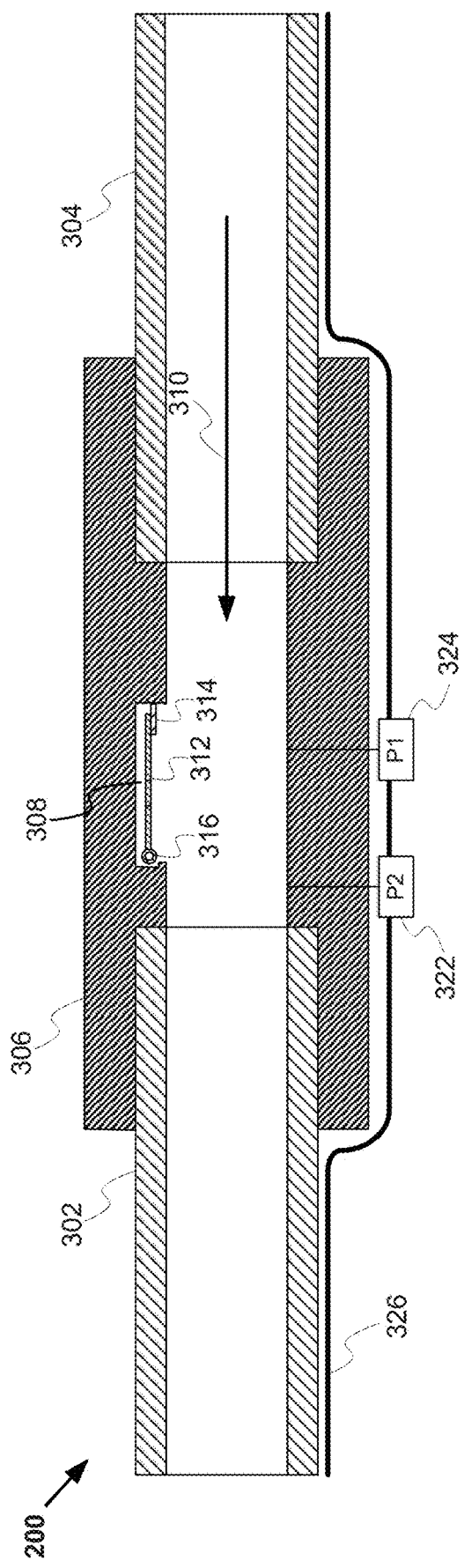
FIG. 3A depicts a cross-sectional view of a first example orifice plate to be used in a wellbore to alter a flow area as part of flow rate monitoring, according to some embodiments.
Figure 3B:
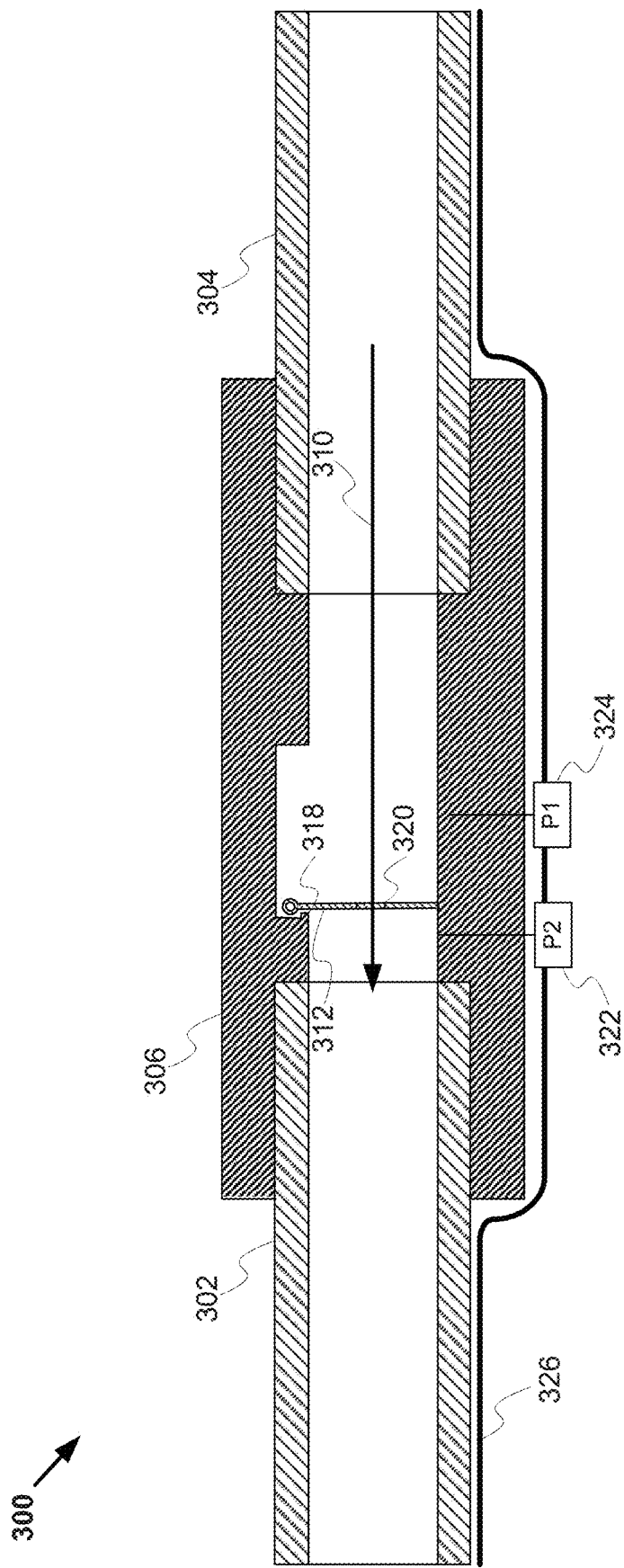
FIG. 3B depicts a cross-sectional view of the first example orifice plate of FIG. 3A after the orifice plate is deployed into a flow of fluid in the wellbore to alter a flow area as part of flow rate monitoring, according to some embodiments.
Figure 4:
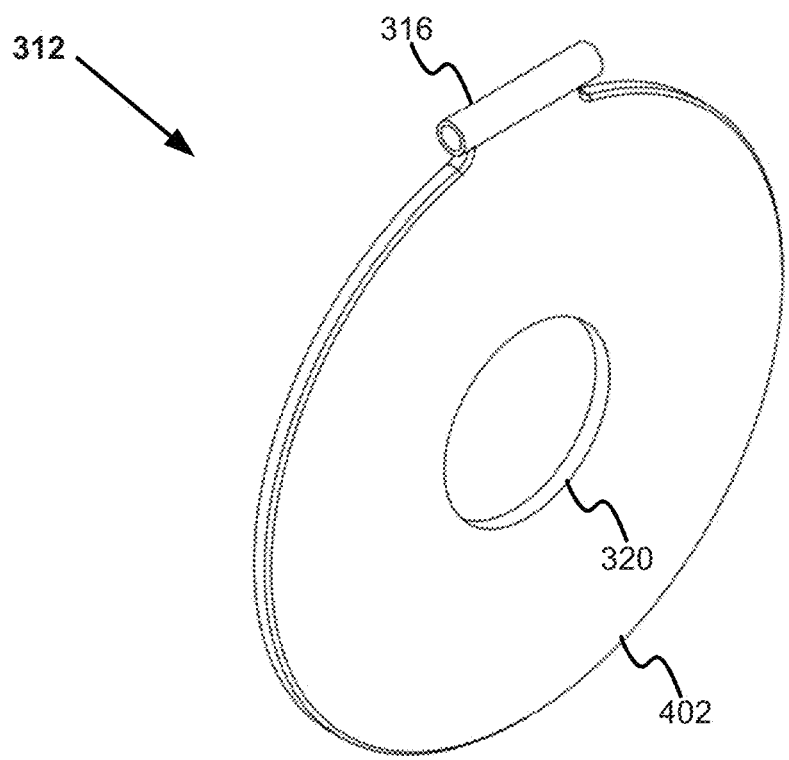
FIG. 4 depicts an isometric view of the first example orifice plate of FIGS. 3A-B, according to some embodiments.
Figure 5A:
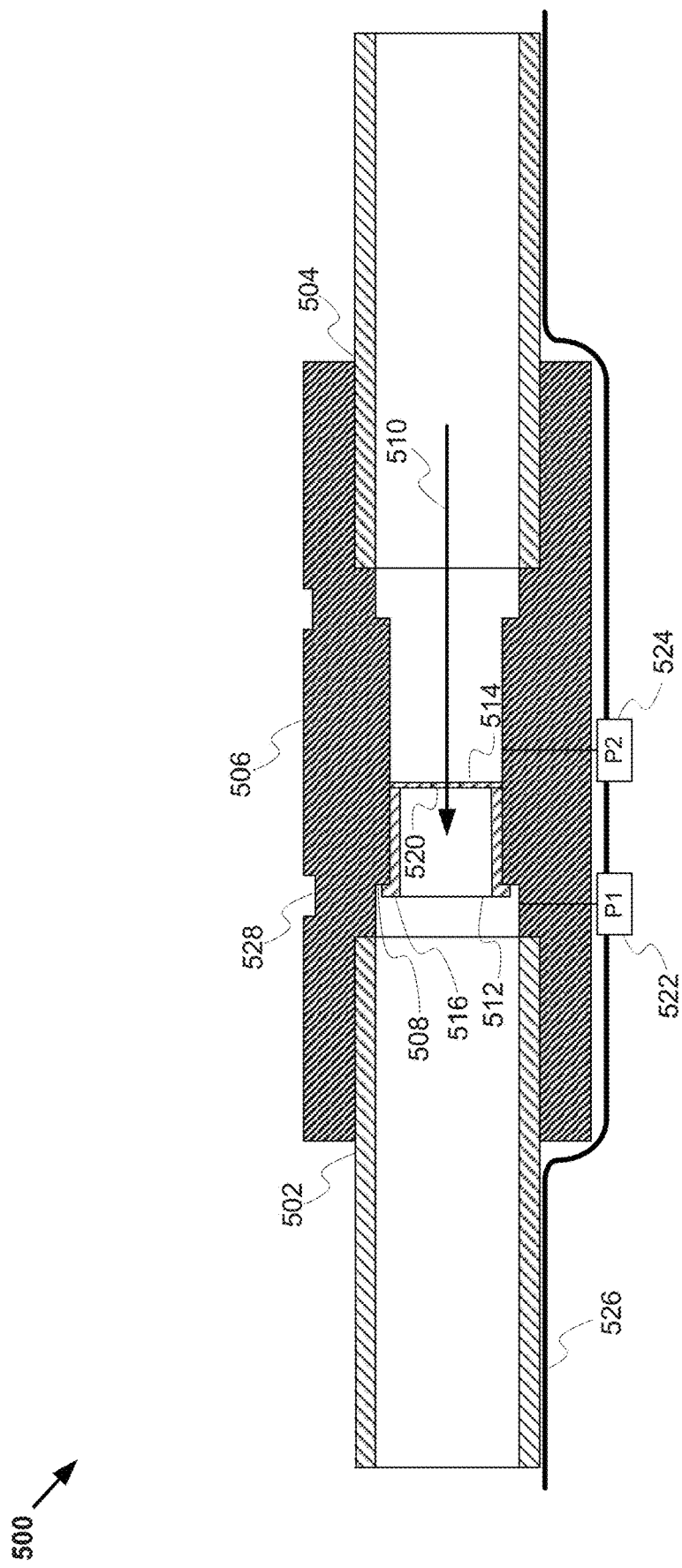
FIG. 5A depicts a cross-sectional view of a second example orifice plate to be used in a wellbore to alter a flow area as part of flow rate monitoring, according to some embodiments.
Figure 5B:
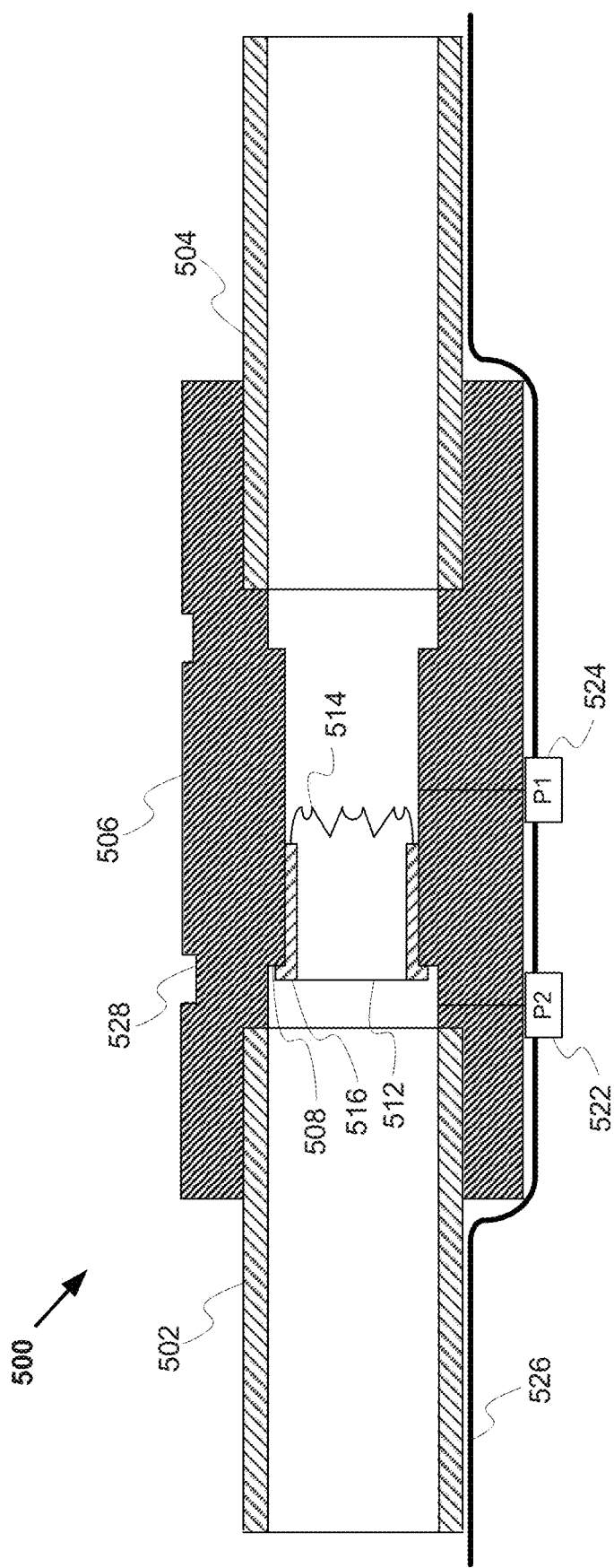
FIG. 5B depicts a cross-sectional view of the second example orifice plate of FIG. 5A, but having been moved into a second position, where a flow area is unaltered, according to some embodiments.
Figure 6:
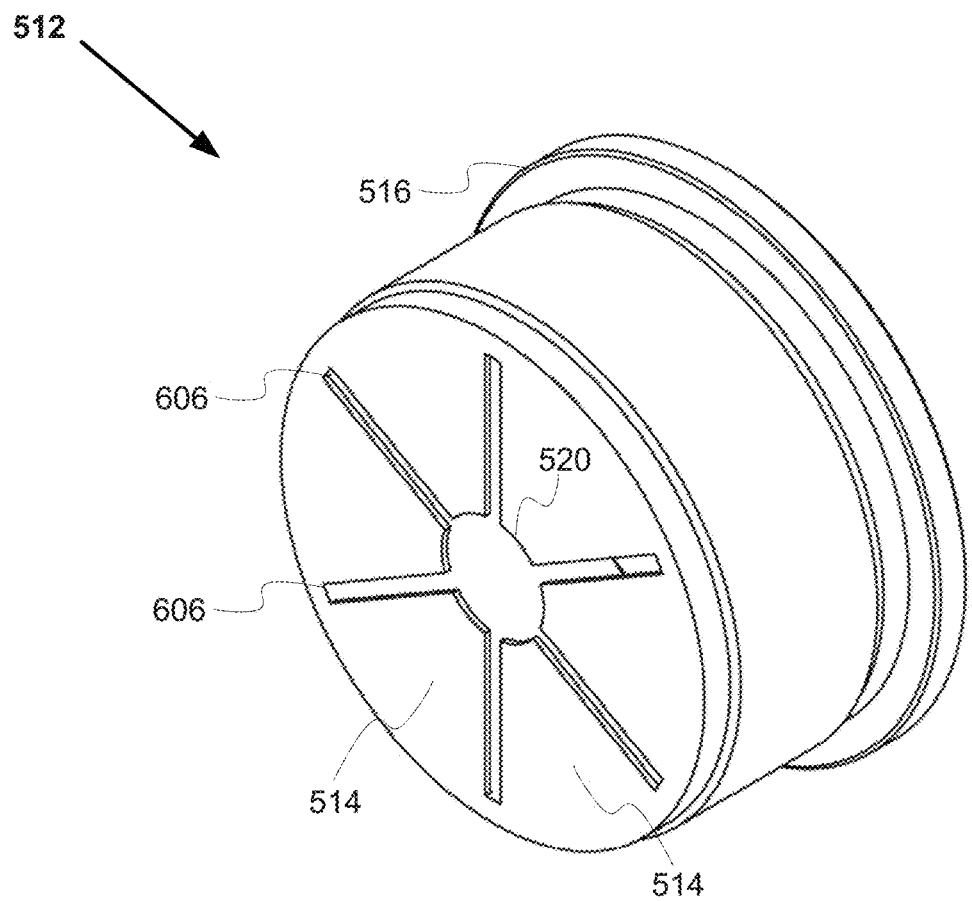
FIG. 6 depicts an isometric view of the second example orifice plate of FIGS. 5A-B, according to some embodiments.
Figure 7:
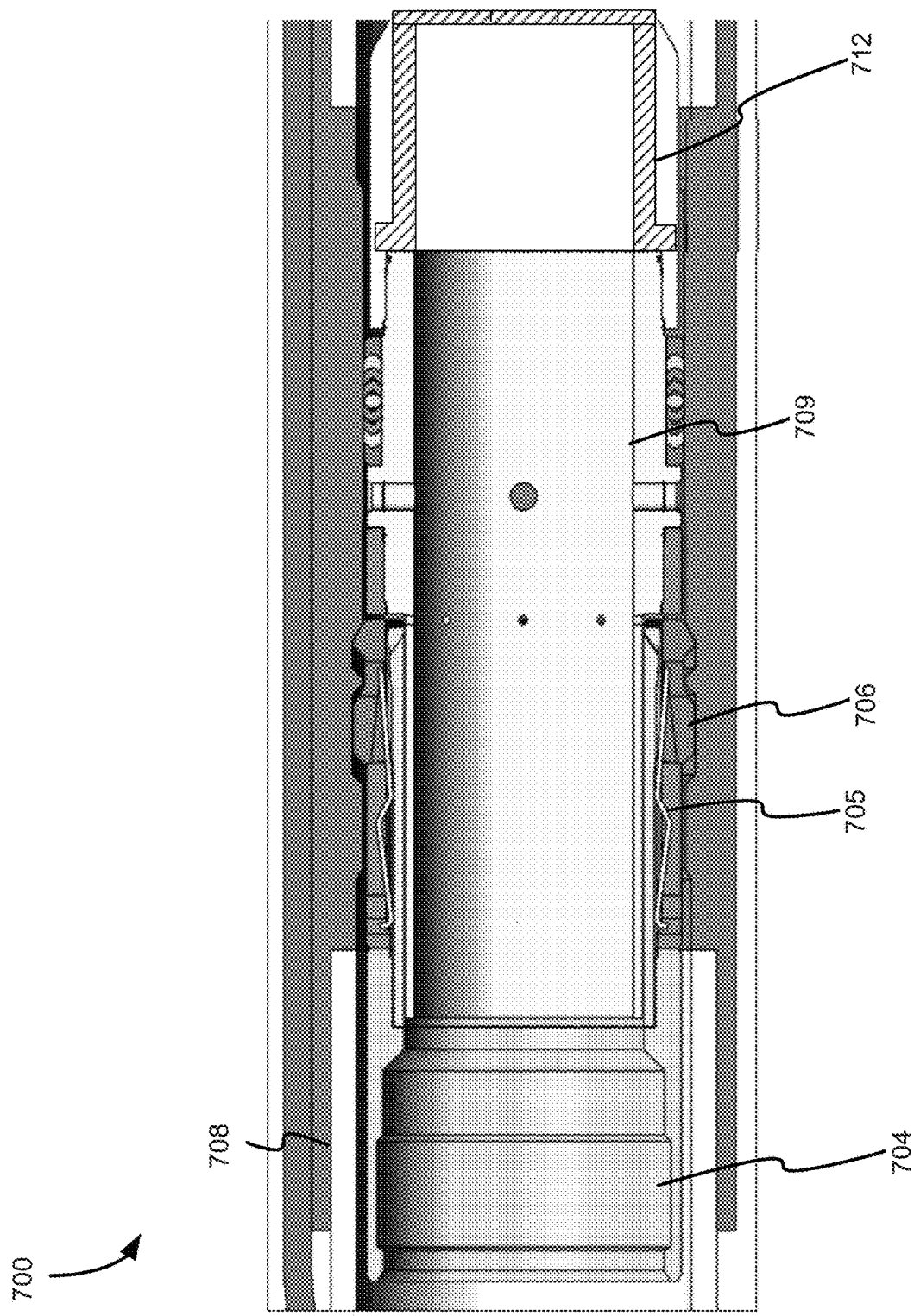
FIG. 7 depicts a cross-sectional view of a lock mandrel with an orifice plate, according to some embodiments.

FIGS. 3A-3B and 4 depict example orifice plate configurations wherein an orifice plate is initially positioned in a recess of a casing using a dissolvable material and is subsequently deployed in a flow of fluid in a wellbore after the dissolvable material is dissolved. FIGS. 5A-5B and 6 depict example orifice plate configurations wherein the orifice plate having flaps that are movable between a first and second position. FIG. 7 depicts an example multi-orifice plate configuration.

FIG. 3A depicts a cross-sectional view of a first example orifice plate to be used in a wellbore to alter a flow area as part of flow rate monitoring, according to some embodiments. A section of casing 300 in a wellbore includes two casing pipes 302 and 304 coupled to each other by a collar 306 having a recess 308 therein. While described as casing pipes, the casing 300 can include any tubular positioned within a wellbore. Fluid can travel to a surface of the wellbore through an interior of the casing pipes 302 and 304, as depicted by an arrow 310. An interior of the collar 306 can have an inner diameter that is substantially equivalent to an inner diameter of the casing pipes 302 and 304.

An orifice plate 312 can be positioned within the recess 308 and secured using a dissolvable material 314. The dissolvable material 314 can be selected to dissolve after a desired period of time. For example, the dissolvable material 314 may be selected to dissolve after the wellbore is in a production stage and a flow rate of the fluid has decreased based on an expected decrease in a production of hydrocarbons from a production zone of the wellbore in which the casing 300 is located. Suitable materials for the dissolvable portion 314 include, but are not limited to, gold, gold-platinum alloys, silver, nickel, nickel-copper alloys, nickel-chromium alloys, copper, copper alloys (e.g., brass, bronze, etc.), chromium, tin, aluminum, aluminum alloys, iron, zinc, magnesium, magnesium alloys, beryllium, any alloy of the aforementioned materials, and any combination thereof. Alternatively, the dissolvable material 314 may be selected to dissolve prior to production based on an expected low volumetric flow through the casing 300. When the dissolvable material 314 dissolves, the orifice plate 312 is deployed into the interior of the casing 300, as depicted in FIG. 3B. A hinge 316 may be spring loaded to ensure that the orifice plate 312 remains within the path of fluid flow once the dissolvable material 314 dissolves. The hinge 316 of the orifice plate 312 enables the orifice plate 312 to move into the interior of the casing 300 as it rotates about the hinge 316 while allowing the orifice plate 312 to rotate to move back into the recess 308 if there is a need to insert or retrieve a downhole tool after the orifice plate 312 has been deployed.

FIG. 3B depicts a cross-sectional view of the first example orifice plate of FIG. 3A after the orifice plate is deployed into a flow of fluid in the wellbore to alter a flow area as part of flow rate monitoring, according to some embodiments. A protrusion 318 of the collar 306 prevents further rotation of the orifice plate 312 by the flow of fluid 310. When the dissolvable material 314 dissolves and the orifice plate 312 is deployed, a flow area of the flow of fluid 310 is altered as the fluid is forced to flow uphole through an opening 320 in the orifice plate 312. The orifice plate 312 is depicted in detail with reference to FIG. 4.

FIG. 4 depicts an isometric view of the first example orifice plate of FIGS. 3A-B, according to some embodiments. The orifice plate 312 has an outer diameter 402 that is substantially equivalent to an inner diameter of the casing 300 such that, when the orifice plate 312 is deployed into the interior of the casing 300, flow is prevented from passing through an annulus formed between the orifice plate 312 and the collar 306 and is instead forced to flow through the opening 320. The opening 320 has an area that is less than a cross-sectional area of the interior of the casing 300 to alter the flow area of the fluid. While the opening 320 is depicted as substantially circular, the opening 320 can be any shape having an area that is less than the cross-sectional area of the interior of the casing 300. While FIG. 4. depicts the orifice plate 312 as having a single opening 320, in some embodiments, multiple openings may be included in the orifice plate 312. For example, the orifice plate 312 may have two or more openings, where the fluid flow area is altered to be a summed area of the two or more openings.

Referring again to FIGS. 3A-B, the orifice plate 312 can be deployed into the interior of the casing 300 using a spring (not pictured in FIGS. 3A-B). For example, a spring can be positioned within the recess 308 that is compressed by the orifice plate 312 until the dissolvable material 314 dissolves, at which point the spring decompresses and pushes the orifice plate 312 into the casing 300. In some embodiments, the orifice plate 312 can be pushed into the casing 300 using a swellable material. For example, a swellable polymer can be positioned within the recess 308 that, after the dissolvable material 314 dissolves, expands to push the orifice plate 312 into the casing 300. The swellable material can be selected to swell at a desired temperature, pressure, or under other downhole conditions at the desired time of deployment. In some embodiments, the orifice plate 312 can be deployed into the interior of the casing using gravity. For example, the casing 300 may be located within a horizontal portion of the wellbore and the orifice plate 312 can fall from the recess 308 after the dissolvable material 314 dissolves. The orifice plate 312 may partially fall into the interior of the casing 300, where the flow of fluid 310 uphole pushes the orifice plate 312 into position, as depicted in reference to FIG. 3B.

In some embodiments, the orifice plate 312 can move back into the recess 308 to perform interventional operations. For example, a coiled tubing tool can be lowered through the casing 300 and, as the coiled tubing tool reaches the orifice plate 312, push the orifice plate 312 into the recess 308. In some embodiments, the orifice plate 312 can be removed by applying a force using a downhole tool (not figured in FIG. 1) to shear the orifice plate 312 to remove it from the collar 306. For example, the downhole tool may include a feature that penetrates the opening 320 to engage the orifice plate 312 as the downhole tool is deployed, and a securing mechanism, such as one or more spring loaded latches, to retain the orifice plate 312 to prevent the orifice plate 312 from disengaging the downhole tool as the tool is removed from the wellbore. Alternatively, the orifice plate 312 can be removed from the casing 300 by flowing an acid through the casing 300 that dissolves the orifice plate 312, or mechanically milling or drilling the orifice plate 312 out.

The casing 300 can include sensors 322 and 324 to measure a property of the fluid as it flows through the casing 300. A first sensor 322 can be positioned downhole of the orifice plate 312 and a second sensor 324 can be positioned at a vena contracta of the fluid flow uphole of the orifice plate 312. While two sensors are depicted in FIGS. 3A-B, in some embodiments, there may be a greater or a lesser quantity of sensors positioned along a casing. The sensors 322 and 324 can be communicatively coupled to a fiber optic cable 326, where the fiber optic cable 326 is interrogated with an interrogation light beam and an optical property of the interrogation light beam changes in response to a change in a property of the fluid between the sensors 322 and 324 caused by an alteration in the flow area of the fluid flow. For example, the sensors 322 and 324 can be pressure sensors and can include a transducer that, in response to detecting a change in pressure between the sensor 322 and the sensor 324, changes an optical property of the interrogation light beam. Alternatively or in addition, the sensors 322 and 324 may be electrical sensors and the fiber optic cable 326 can include one or more electrical cables therein. In some embodiments, the sensors 322 and 324 can be vibration sensors. For example, one or both of the sensors 322 and 324 may include one or more accelerometers and an optical transducer which, in response to detection of a vibration variation, changes the optical property of the interrogation light beam.

Alternatively or in addition, the sensors 322 and 324 may be electro-acoustic technology (EAT) sensing modules configured to change an optical property of the interrogation light beam in response to a detected change in a downhole attribute. In some embodiments, the EAT sensing modules can be activated by deployment of the orifice plate 312 into the casing. For example, if the dissolvable material 314 is a dissolvable conductive metal, the EAT sensing module can periodically check whether the dissolvable material 314 has dissolved using resistivity measurements. The EAT sensing module can activate when it detects that the dissolvable material 314 has dissolved and can then begin measuring and transmitting on a pre-determined schedule. In some embodiments, a swellable material may activate the EAT sensing module. For example, the EAT sensing module can include a strain sensor and can activate when it detects a strain variation caused by swelling of a swellable material selected to push the orifice plate 312 into the casing 300. Alternatively, the EAT sensing module can have an activation time constant and activate after a specified amount of time has passed. Example EAT sensing modules are described in more detail below in reference to FIGS. 9-10.

In some embodiments, the sensors 322 and 324 can be coupled with an acoustic transmitter that, in response to a detected change in a downhole attribute, can emit an acoustic signal that interacts with the fiber optic cable 326. For example, the sensors 322 and 324 can be pressure sensors and can be coupled to a transmitter that emits an acoustic signal in response to a change in pressure between the sensor 322 and the sensor 324. The sensors 322 and 324 can be pressure sensors, temperature sensors, strain sensors, EM sensors, EAT sensing modules, accelerometers, and/or any other type of sensor to detect or measure a downhole attribute.

In horizontal wellbores, fluid flow may be stratified. For example, oil may flow along the "top" of a casing pipe while water flows through the "bottom" of the casing pipe and the oil and water can mix in the middle of the pipe. In some embodiments, there may be a flow path through which the fluid flows, where the oil and water are mixed. In some embodiments, the sensors 322 and 324 can be EAT sensing modules can include an orientation sensing device. The orientation sensing device can be used to determine fluid flow properties when the information is combined with other sensor data. For example, in a horizontal wellbore, the sensor 322 may be positioned within the casing so that it is closer to the surface of the wellbore and a transmitter of the EAT sensing module can modulate the interrogation light beam based on a measurement of the orientation sensing device. The orientation of the sensors 322 and 324 can be used to determine a composition of the fluid flow. For example, a sensor positioned at the "top" of the casing pipe can measure less dense components of a formation fluid, such as a gas or oil, whereas a sensor positioned at the "bottom" of the casing pipe can measure relatively more dense components of the fluid, such as water.

FIG. 5A depicts a cross-sectional view of a second example orifice plate to be used in a wellbore to alter a flow area as part of flow rate monitoring, according to some embodiments. In contrast to the first example orifice plate depicted in FIGS. 5A-5B and 6, an orifice plate 512 of FIG. 5A is not positioned in a wellbore using a dissolvable material. In some embodiments, the orifice plate 512 may be placed in tubulars during well construction while the tubulars are run in hole. Alternatively or in addition, the orifice plate 512 may be deployed as part of an interventional operation using coiled tubing, wireline, or slickline. In some embodiments, the interventional operation may include deployment of one or more orifice plates 512 during a single interventional operation. A section of casing 500 in a wellbore includes two tubulars (hereinafter "casing pipes") 502 and 504 coupled to each other by a collar 506. While described as casing pipes, the tubulars 502 and 504 may be tubulars of a string of tubing disposed within a wellbore, as described in reference to FIG. 2. Fluid can travel to a surface of the wellbore through an interior of the casing pipes 502 and 504, as depicted by an arrow 510.

An orifice plate 512 having flaps 515 at an end of a body of the orifice plate 512 can be positioned within the collar 506, where a flange 516 abuts a wall of a recess 508 of the collar 506 and prevents further axial movement of the orifice plate 512. The flaps 514 are deployable between a first position where a flow area of the fluid flow is altered by the orifice plate 512, as depicted in FIG. 5A, and a second position, as depicted in FIG. 5B, where the flow area of the fluid flow is unaltered by the orifice plate 512. In the first position, the flaps 514 radially extend from the body towards the interior of the casing 500 and are substantially perpendicular with respect to a longitudinal axis defined by the casing pipes 502 and 504, where the flow area of the fluid flow is less than the cross-sectional area of the interior of the collar 506. In the second position, the flaps 514 axially extend from the body of the orifice plate 512 and are substantially parallel with respect to the longitudinal axis defined by the casing pipes 502 and 504, where the flow area of the fluid flow is approximately equal to a cross-sectional area of an interior of the collar 506. FIG. 5B depicts the flaps 514 in the second position.

FIG. 5B depicts a cross-sectional view of the second example orifice plate of FIG. 5A, but having been moved into a second position, where a flow area is unaltered, according to some embodiments. The flaps 514 are movable between the first position and the second position and can be moved between the first and second positions by deploying a downhole tool through the casing 500. With reference to FIG. 5A, a downhole tool (not shown in FIG. 1) moving from the surface of the wellbore downhole can push the flaps 514 from the first position to the second position. For example, a coiled tubing tool can be deployed downhole, where deploying the coiled tubing tool includes moving the coiled tubing tool through the body of the orifice plate 512 and moving the flaps 514 from the first position, where the flow area is altered, to the second position, where the flow area is unaltered. The orifice plate 512 is depicted in more detail with reference to FIG. 6.

FIG. 6 depicts an isometric view of the second example orifice plate of FIGS. 5A-B, according to some embodiments. The orifice plate 512 is shown in the first position, where the flow area of the fluid flow is altered. The orifice plate 512 has an outer diameter that is substantially equivalent to an inner diameter of the casing 500 such that, when the orifice plate 512 is positioned within the interior of the casing 500, flow is prevented from passing through an annulus formed between the orifice plate 512 and the collar 506 and is instead forced to flow through the opening 520 defined by the flaps 514. As depicted, fluid can flow through spaces 606 formed between the flaps 514. However, in some embodiments, the spaces 606 may be absent while the opening 520 remains. The opening 520 has a cross-sectional area that is less than a cross-sectional area of the interior of the casing 500 to alter the flow area of the flow of fluid 510. In embodiments where the spaces 606 are present when the flaps 514 are in the first position, a cross-sectional area of a flow path through the opening 520 and the spaces 606 can be less than the cross-sectional area of the interior of the casing 500. While the opening 520 is depicted as substantially circular, the opening 520 can be any shape having an area that is less than the cross-sectional area of the interior of the casing 500. In some embodiments, the flaps 514 may be deformed by a downhole tool passing through the orifice plate 512 where the flaps 514 are no longer movable to the first position.

Referring again to FIGS. 5A-B, the casing 500 can include sensors 522 and 524 to measure a property of a fluid as it flows through the casing 500. A first sensor 522 can be positioned uphole of the flaps 514 of the orifice plate 512 and a second sensor 524 can be positioned at a vena contracta of the fluid flow uphole of the flaps 514. Similar to the sensors of FIGS. 3A-B, the sensors 522 and 524 can be coupled to a fiber optic cable 526 to be interrogated with an interrogation light beam. Alternatively or in addition, the collar 506 may have ports 528 in which sensors can be positioned to detect changes in downhole attributes caused by altering the flow area of the fluid flow. Sensors mounted in the ports 528 may also be positioned to measure properties of the fluid flow 510 through the casing 500.

FIG. 7 depicts a cross-sectional view of a lock mandrel with an orifice plate, according to some embodiments. A lock mandrel 700 can be positioned within a tubular 708 in a wellbore. For example, with reference to FIG. 1, the lock mandrel 700 can be deployed within the production casing 107 of the wellbore 103 using a slickline. In some embodiments, the lock mandrel 700 may be deployed using retrievable or temporary deployment options. Example deployment options include coiled tubing, wireline, slick line, pumped down modules, modules with unique latching mechanisms to engage at different positions along the wellbore, deployment systems where multiple modules may be deployed in a single operation, self-propelled modules, etc. The lock mandrel 700 can engage with the tubular 708 using packing and/or sealing elements 705 and 706. The lock mandrel 700 may be a slip lock mandrel, a collar lock mandrel, etc. In some embodiments, the lock mandrel 700 can provide a set point for positioning flow control devices downhole. Example flow control devices can include valves, chokes, and plugs.

The lock mandrel 700 includes a mandrel 709 and a connector 704 which can allow for seating of the lock mandrel 700 with the tubular 708. An orifice plate 712 can be attached to an end of the mandrel 709 opposite of the connector 704 to alter a flow area of a fluid flowing through an interior of the tubular 708 and the lock mandrel 700. FIG. 7 depicts the orifice plate 712 as having a flange and movable flaps. For example, the orifice plate 712 may be the orifice plate 512 of FIG. 6. Alternatively, the orifice plate 712 can instead be similar to the orifice plate 312 of FIG. 4 and be positioned within a recess (not shown in FIG. 7) in an interior of the mandrel 709 using a dissolvable material. In some embodiments, multiple orifice plates may be positioned within the lock mandrel 700. For example, in addition to the orifice plate 712, one or more orifice plates can be positioned within the interior of the mandrel 709 and/or other portions interior to the tubular 708. In some embodiments, the orifice plate 712 may be deployed as part of an interventional operation using coiled tubing, wireline, or slickline after the mandrel 709 is positioned within the tubular 708. The interventional operation may include deployment of one or more orifice plates during a single interventional operation.

Sensors (not shown in FIG. 7) can be configured to measure a property or characteristic of a flow of fluid through the lock mandrel 700 and can be coupled with a fiber optic cable to detect a change in a downhole attribute that changes in response to an alteration of the flow area of a fluid caused by the orifice plate 712, as previously described in reference to FIGS. 3A-B and FIGS. 5A-B. The fiber optic cable (not shown in FIG. 7) may be permanently attached to the casing, temporarily deployed in a well where a coiled tubing/wireline/slickline may contain optical fiber, or deployed by temporary deployment means where fibers are launched as a deployment vehicle moves down the wellbore (gravity-based deployment modules, pump down modules, self-propelled modules) or when the deployment vehicle is pulled out of the wellbore (coiled tubing, wireline, slickline).

Figure 8:
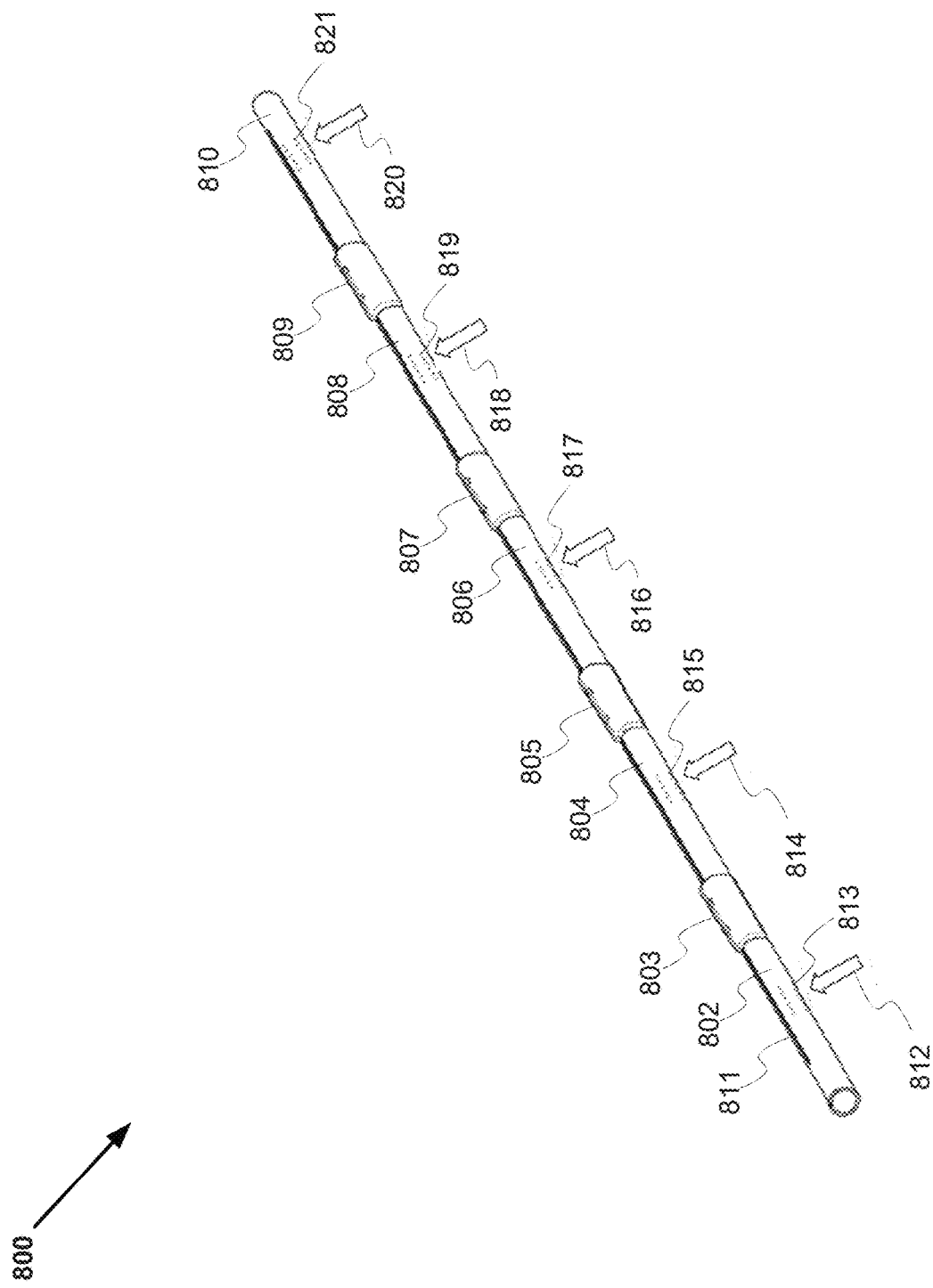
FIG. 8 depicts an example arrangement of multiple casing collars having orifice plates positioned along a casing, according to some embodiments.

FIG. 8 depicts an example arrangement of multiple casing collars having orifice plates positioned along a casing, according to some embodiments. A casing 800 includes sections 802, 804, 806, 808, and 810 through which a fluid can flow from downhole of a wellbore uphole to a surface of the wellbore. Casing collars 803, 805, 807, and 809 are interspersed along the casing 800 and couple sections of casing to one another. The collar 803 couples section 802 with section 804, the collar 805 couples section 804 with section 806, the collar 807 couples section 806 with section 808, and the collar 809 couples section 808 with section 810. While sections 804, 804, 806, 808, and 810 are depicted having equal lengths, the lengths of sections can be different.

A fiber optic cable 811 can be communicatively coupled with sensors in the collars 803, 805, 807, and 809 and can be interrogated with an interrogation light beam to measure and/or detect a change in a downhole attribute that changes in response to an alteration of a flow area of a fluid caused by deploying an orifice plate into an interior of the casing 800.

Arrows 812, 814, 816, 818, and 820 represent flows of fluid from the wellbore into the interior of the casing 800 through perforations 813, 815, 817, 819, and 821 in the casing or tubing of the sections 802, 804, 806, 808, and 810, respectively. In some embodiments, when the casing 800 is positioned within the wellbore, packers can isolate sections of the wellbore to define distinct production zones. For example, a packer may be positioned uphole of the section 802 to define a production zone below the packer, and fluid from the production zone can flow into the section 802 through the perforations 813, as illustrated by the arrow 812. In some embodiments, the wellbore may have been completed by an unconventional well plug and perf completion where zonal isolation is achieved with cementing within the annular space and reservoir access is achieved through perforations and fracturing operations.

One or more of the collars 803, 805, 807, and 809 can include an orifice plate positioned within a recess of the collar. For example, with reference to FIGS. 3A-B, the collar 803 can include the orifice plate 312. Alternatively or in addition, one or more orifice plates can be positioned within a recess of a casing pipe or other tubular comprising the sections 802, 804, 806, 808, and 810. In some embodiments, different orifice plates having different sized openings can be selected for each of the collars 803, 805, 807, and 809. For example, the collar 803 can include the orifice plate of FIG. 4 and the collar 805 can include the orifice plate of FIG. 6. The orifice plates can be selected based on expected flow volumes through a section of the casing 800. For example, with reference to FIG. 4, the collar 803 can include the orifice plate 312 where a diameter of the opening 320 of the orifice plate 312 is selected based on the expected volumetric flow rate of fluid (as depicted by the arrow 812) and the collar 805 can have an orifice plate where the diameter of the opening 320 is selected based on the expected volumetric flow rate of fluid (as depicted by the arrow 814).

In some embodiments, the fiber optic cable 811 and sensors within the collars 803, 805, 807, and 809 can be part of a distributed acoustic sensing (DAS) system. After orifices plates are deployed into an interior of the casing 800, the fluid flow area is altered as it flows from one section of the casing 800 uphole to another section of the casing 800. The alteration of the fluid flow area may cause detectable acoustic signatures that are proportional to a flow rate of the fluid. Alternatively or in addition, the fiber optic cable 811 and sensors within the collars 803, 805, 807, and 809 can be part of a distributed temperature sensing (DTS) system and/or a distributed strain sensing (DSS) system.

Distributed sensing systems used in combination with deployable orifice plates can be used to determine a flow rate of a fluid as it flows through a casing, determine a flow regime, and/or map production rates for a wellbore. Orifice plates can be positioned within a recess of a casing at any location along a wellbore and in any quantity. While five sections and four casing collars are depicted in FIG. 8, in some embodiments, there may be fewer sections and/or collars or more sections and/or collars.

Example Operations

Figure 9:
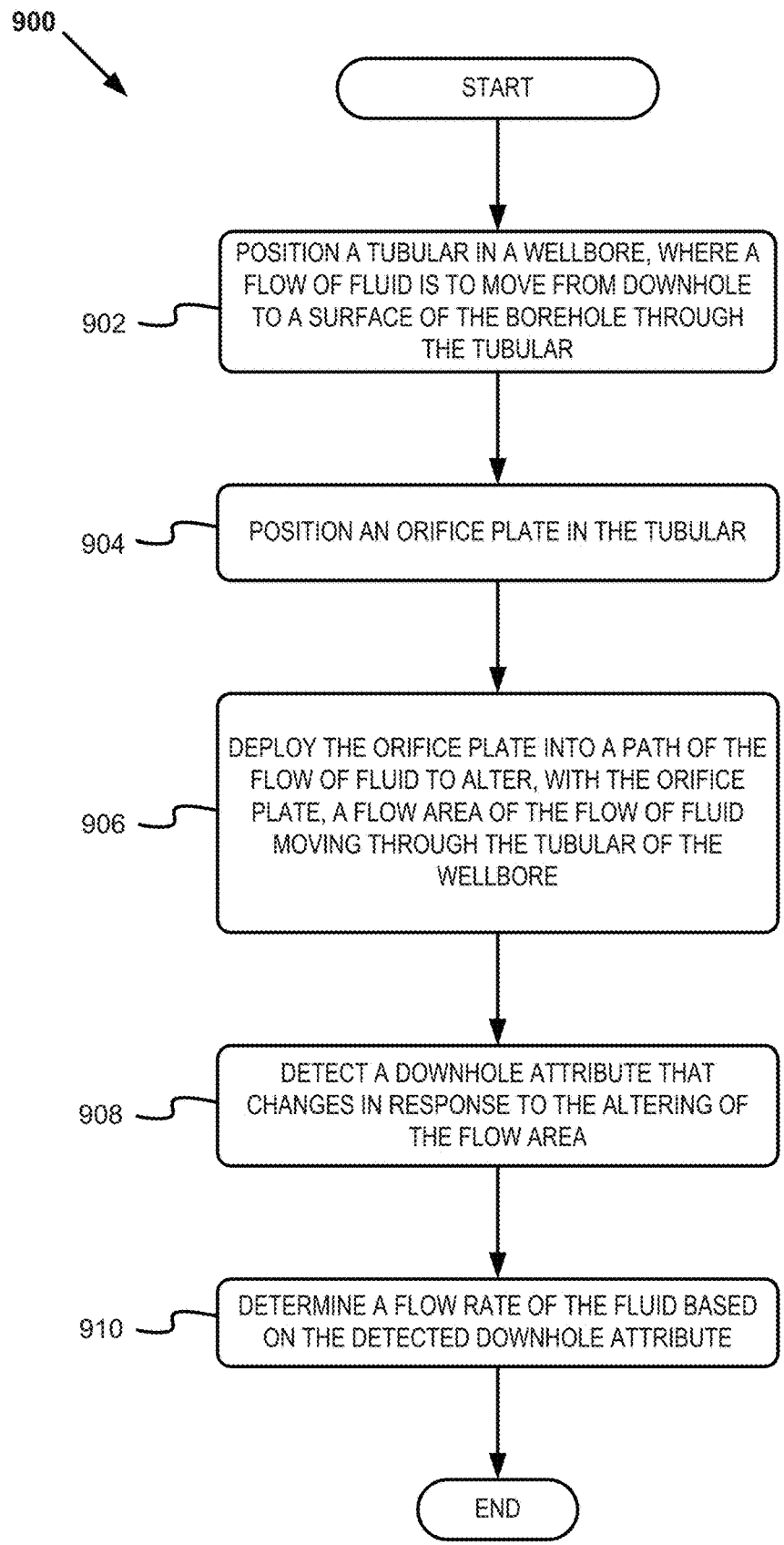
FIG. 9 depicts a flowchart of example operations for determining a flow rate of a fluid based on altering a flow area of the fluid, according to some embodiments.

FIG. 9 depicts a flowchart of example operations for determining a flow rate of a fluid based on an alteration of a flow area of the fluid, according to some embodiments. Operations of a flowchart 900 of FIG. 9 can relate to altering a flow area of a fluid in a wellbore to enable monitoring of a flow rate of the fluid. The flow of fluid can be from downhole to the surface or from the surface downhole. Additionally, the fluid can be any type of fluid flowing downhole. For example, the fluid can be fluid flowing from a formation surrounding a wellbore to a surface of the wellbore through an interior of a casing in the wellbore. Operations of the flowchart 900 are described with reference to the example system and orifice plates depicted in FIGS. 1-8, described above.

At block 902, a tubular is positioned within a wellbore such that a flow of fluid is to move from downhole to a surface of the wellbore through the tubular. The tubular can be a casing of the wellbore. For example, with reference to FIG. 1, the wellbore 103 is cased with the production casing 107 and fluid is to move from downhole to the surface of the wellbore through the production casing 107. In some embodiments, the tubular can be a tubing positioned within a casing of the wellbore. For example, with reference to FIG. 2, the tubing 209 is positioned within the wellbore 203 and fluid can flow uphole or downhole through the tubing 209.

At block 904, an orifice plate is positioned in the tubular. For example, with reference to FIG. 1, one or more orifice plates can be positioned in recesses of the production casing 107. Positioning of the orifice plates in these recesses can occur prior to or after the production casing 107 being placed downhole. In some embodiments, the orifice plate can be secured within the recess of the production casing 107 using a dissolvable material. For example, with reference to FIGS. 3A-B, the orifice plate 312 can be positioned in the recess 308 of the casing 300 and secured within the recess 308 with the dissolvable material 314. In some embodiments, the orifice plate can include a flange receivable within a recess of the casing. For example, with reference to FIGS. 5A-B, the flange 516 of the orifice plate 512 can be positioned within the recess 508. In some embodiments, the orifice plate can be part of a lock mandrel positioned within the tubular. For example, with reference to FIG. 7, the lock mandrel 700 having the orifice plate 712 can be positioned within the tubular.

At block 906, a flow area of the flow of fluid moving through the tubular is altered by deploying the orifice plate into a path of the flow of fluid. In some embodiments, the orifice plate can be deployed into the interior of the casing by dissolving a dissolvable material that secures the orifice plate within the recess of the casing. For example, with reference to FIGS. 3A-B, the orifice plate 312 can be deployed after the dissolvable material 314 dissolves, where the orifice plate 312 is deployed into the interior of the casing 300 as it rotates about the hinge 316. The flow area of the flow of fluid uphole is altered as it flows through the opening 320 in the orifice plate 312.

At block 908, a downhole attribute that changes in response to the altering of the flow area is detected. For example, the attribute may be a volume, fluid displacement, mass, an acoustic variation, a temperature, a vibration, a strain variation, and/or a pressure variation. The change in the downhole attribute can be detected by measuring the downhole attribute at a first and second location in the wellbore using sensors, where the first location is downhole of the orifice plate and the second location is uphole of the orifice plate at a vena contracta of the fluid flow after it flows through an opening in the orifice plate. For example, with reference to FIG. 3B, the sensor 324 is positioned downhole of the orifice plate 312 and the sensor 322 is positioned uphole of the orifice plate 312. The sensors can be pressure sensors, temperature sensors, strain sensors, sensors of EAT sensing modules, etc. and/or any other sensor for measuring downhole attributes.

The change in the downhole attribute can be detected by interrogating a fiber optic cable with an interrogation light beam, where the fiber optic cable is communicatively coupled with one or more sensors. For example, with reference to FIG. 3B, the sensors 322 and 324 are communicatively coupled to the fiber optic cable 326. The sensors can change an optical property of the interrogation light beam in response to a measured change in a downhole attribute between two sensors. For example, with continued reference to FIG. 3B, the sensors 322 and 324 can be electromagnetic sensors having a piezo-electric element that, in response to detecting a voltage differential, mechanically interacts with the fiber optic cable 326 and alters an optical property of the interrogation light beam, which can be detected uphole based on a reflected optical signal. Example optical properties that may be altered include a phase, a wavelength, an amplitude, an intensity, etc. of the interrogation light beam.

In some embodiments, the sensors can be electro-acoustic technology (EAT) sensing modules and can communicate data collected by sensors of the EAT sensing module to the fiber optic cable using an acoustic transducer. For example, with reference to FIG. 3B, the sensors 322 and 324 can be EAT sensing modules having pressure sensors therein to measure a change in pressure of the flow of fluid, and transducers of the EAT sensing modules can emit acoustic signals representing the measured pressures that interact with the fiber optic cable 326. For example, with continued reference to FIG. 3B, the sensors 322 and 324 can be vibration sensors and can measure a variation in acoustic noise of the flow of fluid 310 after the orifice plate 312 has been deployed into the interior of the casing 300.

At block 910, a flow rate of the fluid is determined based on the detected change of the downhole attribute. For example, with reference to FIG. 1, the interrogator 112 can receive a reflected light beam from the fiber optic cable 113, where an optical property of the reflected light beam is changed based on measurements from the sensors 120A-C. The signal sensing system 191 can transmit the received signal to the computer 190, which, based on the received signals, determines the flow rate of fluid through the orifice plate. The flow rate may be a flow rate for a single phase fluid or a multiphase fluid. For example, the fluid may include two or more of oil, water, and a gas. Multiphase fluid flow rates are described in more detail below in reference to FIG. 12. Operations of the flowchart 900 are complete.

FIG. 9 is annotated with a series of numbers. These numbers represent stages of operations. Although these stages are ordered for this example, the stages illustrate one example to aid in understanding this disclosure and should not be used to limit the claims. Subject matter falling within the scope of the claims can vary with respect to the order and some of the operations.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 802 and 804 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus. The program code may be executed manually, on demand or automated in a closed loop mode with periodic updates, notifications and/or exception-based notifications once certain defined thresholds are exceeded. Thresholds may be defined as specific absolute values, percentage values, rate of change values, specific patterns or series of patterns where thresholds may be applied to raw measured data and/or post processed data and/or data filtered in frequency and/or time domains in one or more combinations of said data. The program code may be executed locally on computers or processors at the well site and may communicate with remote software applications through various wired or wireless communication mechanisms where data and communication with users are enabled through local, global, or cloud-based services interacting with computers and/or handheld personal devices.

Example Sensors

Figure 10:
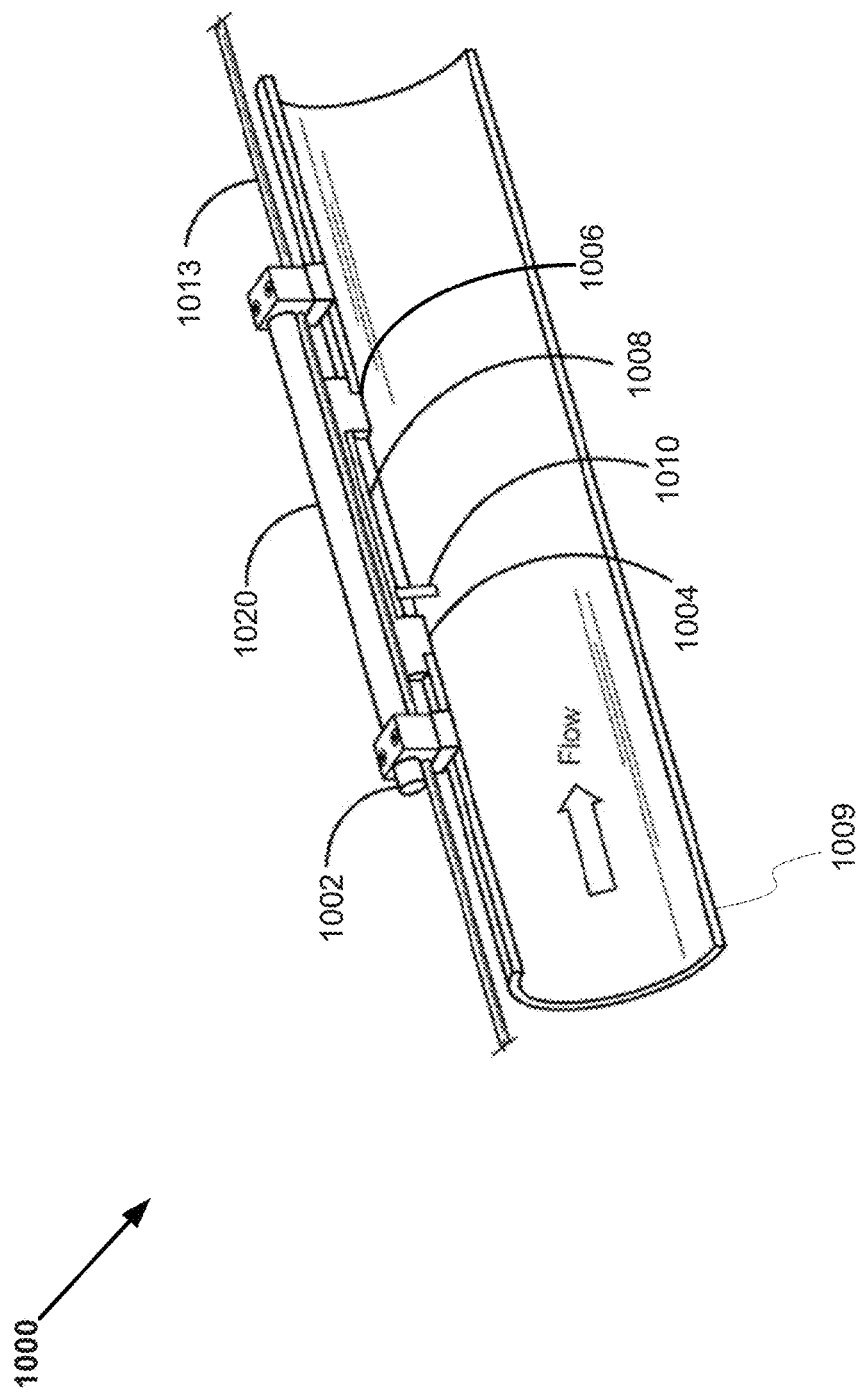
FIG. 10 depicts a cross-sectional view of a first example electro-acoustic technology sensing module, according to some embodiments.

Example sensors and sensing modules for monitoring fluid flow are now described in reference to FIGS. 10-13. FIG. 10 depicts a cross-sectional view of a first example electro-acoustic technology (EAT) sensing module, according to some embodiments. A section 1000 of a casing 1009 (or other tubular) of a wellbore can include a first example electro-acoustic technology (EAT) sensing module 1020 coupled to a fiber optic cable 1013. The EAT sensing module 1020 can include a sensor 1004 positioned downhole of a recess 1008 and a sensor 1006 positioned uphole of the recess 1008. The sensor 1004 can be any sensor to measure a downhole attribute. For example, the sensor 1004 can be a pressure sensor. In some embodiments, more than one sensor may be present to measure a change in a downhole attribute between two locations in the wellbore. Example sensors can include one or more of temperature sensors, optical and/or electrical pressure sensors, differential pressure sensors, acoustic sensors, vibration sensors, accelerometers, geophones, resistance sensors, capacitance sensors, chemical sensors, etc.

The EAT sensing module 1020 can include a transmitter 1002 to transmit data communications through the fiber optic cable 1013 by changing one or more optical properties of light travelling through the fiber optic cable 1013. Changes in optical properties may be induced by strain, vibration, acoustic signals, temperature, pressure, etc. For example, the transmitter 1002 may be an acoustic transmitter and transmit an acoustic signal representing a measurement of a downhole attribute that vibrates the fiber optic cable 1013. In some embodiments, the EAT sensing module 1020 can include additional sensors, electronics, batteries, and/or transducers.

In some embodiments, the EAT sensing module 1020 can include an energy harvester 1010. The energy harvester 1010 can extend radially from the EAT sensing module 1020 towards an interior of the casing 1009 such that at least a portion of the energy harvester 1010 is positioned in a path of the fluid flow. The energy harvester 1010 can include one or more piezo-electric crystals that, when vibrated by the flow of the fluid, convert mechanical energy of the vibrations to electrical energy which can be used to power sensor electronics downhole. For example, energy generated by the energy harvester 1010 can be used to power the sensors 1004 and 1006. In some embodiments, a voltage produced by the energy harvester 1010 can be used to determine a flow rate of the fluid. For example, a vibrational frequency of the piezo-electric crystals of the energy harvester 1010 can be determined based on the voltage produced by the energy harvester 1010, and velocity of the fluid can be determined based on the frequency of vibration. The energy harvester 1010 can be positioned in close proximity to a measurement position in order to increase fluid mixing and can vary in orientation, size, and shape. For example, with reference to FIG. 3B, an energy harvester can be positioned uphole of the orifice plate 312 and downhole of the sensor 322 to increase turbulence and mixing of the fluid.

Figure 11:
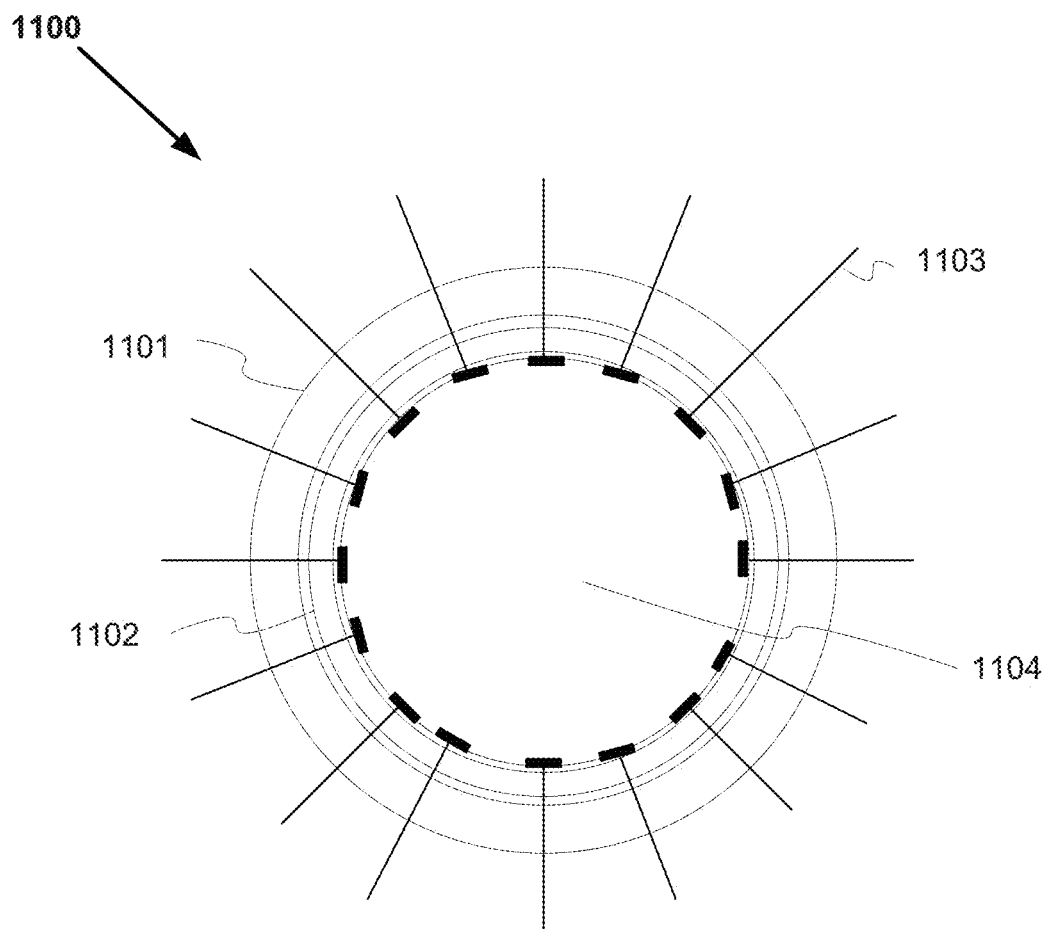
FIG. 11 depicts a cross-sectional view of a second example electro-acoustic technology sensing module, according to some embodiments.

FIG. 11 depicts a cross-sectional view of a second example electro-acoustic technology sensing module, according to some embodiments. A second example electro-acoustic technology (EAT) sensing module 1100 can include one or more sensors, electronics, batteries, and/or acoustic transducers for data transmission to an optical fiber. For example, with reference to FIG. 1, one or more of the sensors 120A-C may be EAT sensing modules coupled with the fiber optic cable 113, where the fiber optic cable 113 is interrogated by a distributed acoustic sensing (DAS) system, such as the interrogator 112.

The EAT sensing module 1100 includes a metal pipe 1101, an insulating pipe 1102, and electrodes and/or sensors, such as sensor 1103. The EAT sensing module 1100 may include one or more of the sensors 1103. For example, FIG. 11 depicts sixteen sensors. However, any number of sensors may be used. The sensors may be of different type and may be mechanically configured for specific applications and/or implementations. For example, the EAT sensing module 1100 can be positioned within a horizontal portion of a wellbore and the sensors 1103 can include orientation devices, as previously described with reference to FIGS. 3A-B.

In the center of the EAT sensing module 1100 is an imaging area 1104. The EAT sensing module 1100 of FIG. 11 may be an example of one of many EAT sensing module configurations used in a well system, such as the well system of FIG. 1. The EAT sensing module 1100 may include one or more of temperature, pressure, differential pressure, acoustic, vibration, accelerometer(s), geophone(s), resistance, capacitance, and chemical sensors. The EAT sensing module 1100 may use one of many configurations in combination with deployable orifice plates, such as the orifice plate 312 of FIG. 4, to detect a change in a downhole attribute in response to an alteration of the flow area by the orifice plate 312. The EAT sensing module 1100 may incorporate energy harvesting devices and techniques, as previously described with reference to FIG. 10. The energy harvesting devices (not shown) may be spaced at different positions and configurations (both in distance, orientation, size and shape) in close proximity to the measurement position in order to promote fluid mixing.

The EAT sensing module 1100 may also be a pressure sensor in a single pressure sensor configuration, where two independent pressure measurements are obtained, or in a differential pressure configuration. Either configuration can be used with an orifice plate to determine a flow rate based on a detected variation of a downhole attribute. The flow rate measurements may be augmented by temperature measurements and/or acoustic measurements using single point sensors coupled in the EAT sensing module 1100, DTS measurements, and/or DAS measurements.

Figure 12:
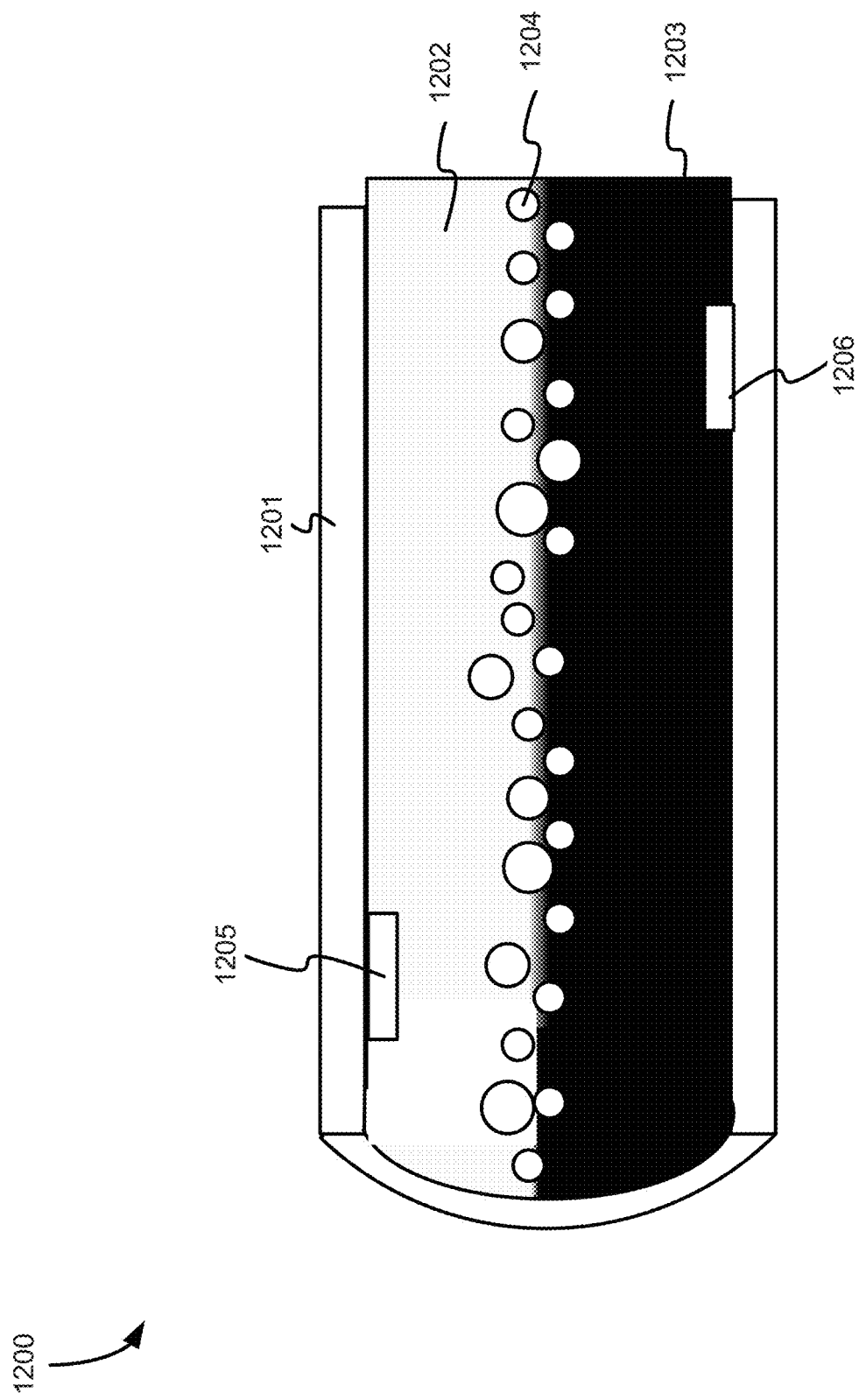
FIG. 12 depicts an example system for monitoring a stratified flow structure, according to some embodiments.

When using EAT sensing modules, such as EAT sensing module 1100 of FIG. 11, for flow monitoring, challenges with multiphase fluid measurements may include different fluid velocities and flow regimes over depth along the wellbore and over time. FIG. 12 depicts an example system for monitoring a stratified flow structure, according to some embodiments. In stratified flow systems, such as flow system 1200 of FIG. 12, fluids in a casing 1201 of a wellbore separate due to the different fluid densities, velocities, and flow regimes. For simplicity, FIG. 12 depicts two fluid types, though wellbores may have many fluid types. The fluid is composed of water 1203 and oil 1202 flowing through the casing 1201. In the stratified flow structure, the water 1203 stays at the bottom of the casing while the oil 1202 rests on top of the water 1203. The fluids may mix in the middle, leading to bubbles, such as a bubble 1204, to form along the mixing line. It may be beneficial to place two or more EAT sensors, such as sensors 1205 and 1206, at two or more locations and use cross-correlation of signals between measurement locations for multi-phase measurements to handle slip between different phases. This allows for measure of travel time of each phase, bubbles, and/or slugs between the sensor locations as lighter fluids and gases travel faster than heavier components.

Figure 13:
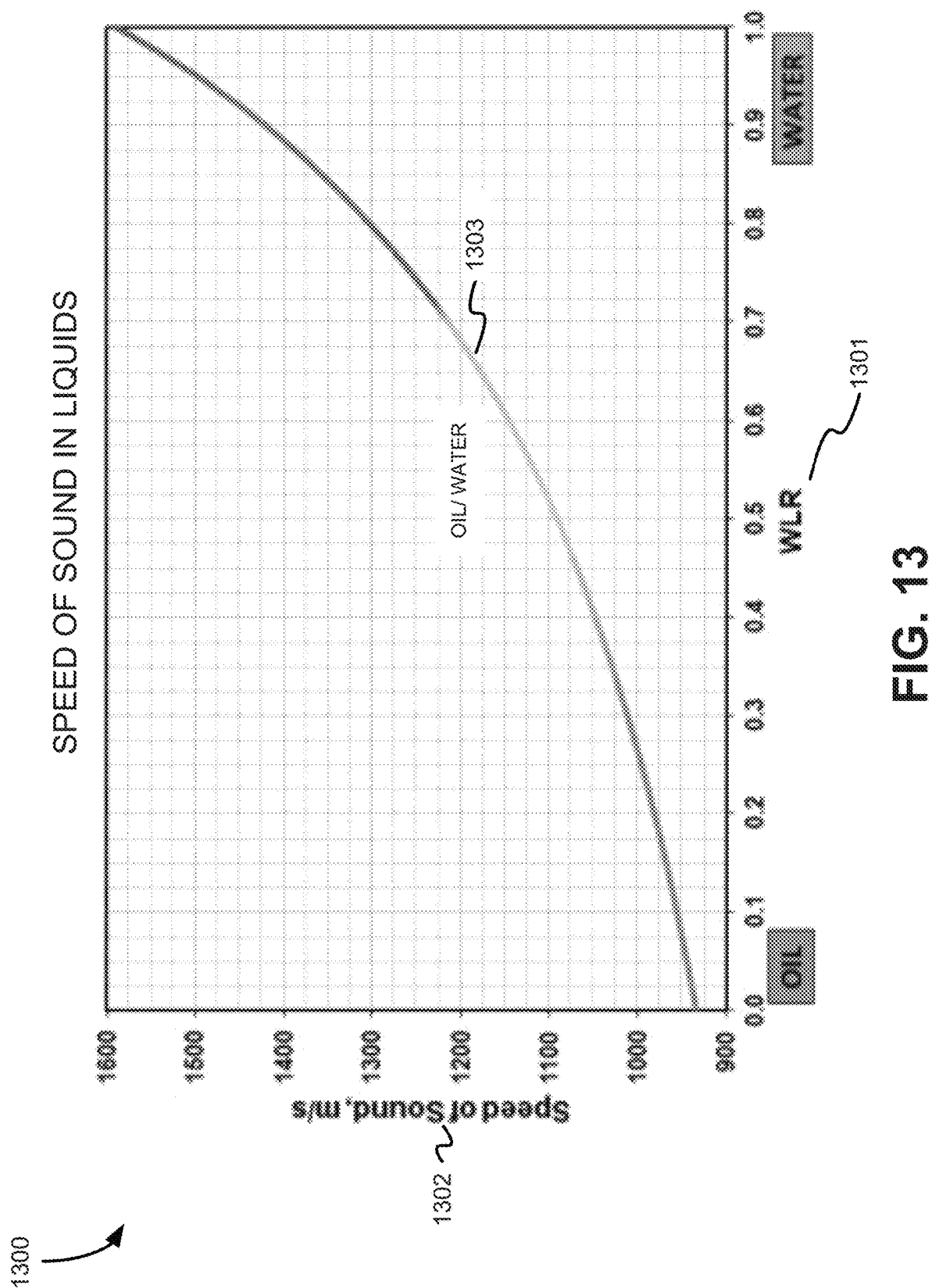
FIG. 13 depicts a graph of speed of sound in liquids, according to some embodiments.

Speed of sound in a liquid may be used to determine the phase fraction of oil to water. FIG. 13 provides an example of how speed of sound changes with respect to the fraction of oil to water. Turbulent flow may generate acoustic signals that may be used for speed of sound measurements whereas active pinging may be better suited for laminar flow and transition regions between laminar to turbulent flow. Accurate speed of sound measurements may require uniform mixing of the phases which may be a challenge in laminar flow conditions which easily may occur in low-rate horizontal wells where fluids may separate. Multiple acoustic velocities may be measured, one for each phase, and signal properties like amplitude or relative amplitudes may be used as an indication of volume fractions. Similarly, gas-liquid ratios may also be determined using speed of sound measurements.

FIG. 13 depicts a graph of speed of sound in liquids, according to some embodiments. A graph 1300 displays the change in speed of sound across liquids ranging from pure oil to pure water. An x-axis 1301 represents the water-in-oil ratio (WLR) while a y-axis 1302 represents the speed of sound in units of m/s. From trendline 1303, it can be determined that the speed of sound increases as fluids transition from purely oil to purely water.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

While the aspects of the disclosure are described with reference to various implementations and exploitations, it will be understood that these aspects are illustrative and that the scope of the claims is not limited to them. In general, techniques for flow monitoring as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Embodiment 1: A method comprising: positioning a tubular within a wellbore formed in a subsurface formation, wherein a flow of fluid is to move through the tubular, wherein an orifice plate is positioned in the tubular, and wherein the orifice plate is movable between a first position and a second position after being positioned in the tubular to alter a flow area of the flow of fluid moving through the tubular; detecting a change in a downhole attribute that changes in response to the alteration of the flow area of the flow of fluid; and determining a flow rate of the flow of fluid based on the detected change in the downhole attribute.

Embodiment 2: The method of Embodiment 1, wherein the orifice plate is secured in the first position within a recess of the tubular using a dissolvable material.

Embodiment 3: The method of Embodiment 2, wherein the orifice plate is to move to the second position after the dissolvable material dissolves, wherein the second position includes a path of the flow of fluid in an interior of the tubular.

Embodiment 4: The method of Embodiment 3, wherein the orifice plate is to move to the second position by pushing the orifice plate into the path of the flow of fluid using at least one of a spring and a swellable polymer.

Embodiment 5: The method of Embodiment 1, wherein the orifice plate has a first cross-sectional area after moving to the second position, wherein a path of the flow of fluid has a second cross-sectional area, wherein the first cross-sectional area is less than the second cross-sectional area.

Embodiment 6: The method of Embodiment 5, wherein the orifice plate comprises a plurality of flaps, wherein, in the first position, the flaps are positioned substantially perpendicular to a longitudinal axis of the tubular, and wherein, in the second position, the flaps are positioned substantially parallel to the longitudinal axis.

Embodiment 7: The method of Embodiment 6, wherein the orifice plate is to move from the first position to the second position in response to deploying a downhole tool, wherein the downhole tool pushes the flaps to the second position.

Embodiment 8: The method of any one of Embodiments 1-7, wherein detecting the change in the downhole attribute comprises detecting, with one or more sensors, a change in a property of the flow of fluid between a first location in the wellbore and a second location in the wellbore.

Embodiment 9: The method of any one of Embodiments 1-8, wherein the downhole attribute comprises at least one of a pressure variation, a temperature variation, an acoustic variation, a vibration, and a strain variation.

Embodiment 10: An apparatus comprising: an orifice plate to be positioned in a tubular within a wellbore, wherein the orifice plate is to move from a first position to a second position after being positioned in the tubular to alter a flow area of a flow of fluid moving through the tubular, wherein a change in a downhole attribute that changes in response to the alteration of the flow area of the flow of fluid is detected, and wherein a flow rate of the flow of fluid is determined based on the detected change in the downhole attribute.

Embodiment 11: The apparatus of Embodiment 10, wherein the orifice plate is to be secured in the first position within a recess of the tubular using a dissolvable material.

Embodiment 12: The apparatus of Embodiment 11, wherein the orifice plate is to move to the second position after the dissolvable material dissolves, wherein the second position includes a path of the flow of fluid in an interior of the tubular.

Embodiment 13: The apparatus of Embodiment 12, wherein the orifice plate is to move to the second position by pushing the orifice plate into the path of the flow of fluid using at least one of a spring and a swellable polymer.

Embodiment 14: The apparatus of Embodiment 10, wherein the orifice plate comprises a plurality of flaps, wherein, in the first position, the flaps are positioned substantially perpendicular to a longitudinal axis of the tubular, and wherein, in the second position, the flaps are positioned substantially parallel to the longitudinal axis.

Embodiment 15: The apparatus of Embodiment 14, wherein the orifice plate is to move from the first position to the second position in response to deploying a downhole tool within the wellbore, wherein the downhole tool pushes the flaps to the second position.

Embodiment 16: The apparatus of any one of Embodiments 10-15, wherein the tubular is one of a tubing and a casing of the wellbore.

Embodiment 17: The apparatus of any one of Embodiments 10-16, wherein the downhole attribute comprises at least one of a pressure variation, a temperature variation, an acoustic variation, a vibration, and a strain variation.

Embodiment 18: A system comprising: an orifice plate to be positioned in a tubular of a wellbore, wherein the orifice plate is to move from a first position to a second position after being positioned in the tubular to alter a flow area of a flow of fluid moving through the tubular; at least one sensor to detect a change in a downhole attribute that is to change in response to the alteration of the flow area; a processor; and a computer-readable medium having instructions stored thereon that are executable by the processor to cause the system to determine a flow rate of the flow of fluid based on the detected change in the downhole attribute.

Embodiment 19: The system of Embodiment 18, wherein the orifice plate is to be secured in the first position within a recess of the tubular using a dissolvable material, and wherein the orifice plate is to move to the second position after the dissolvable material dissolves, wherein the second position includes a path of the flow of fluid in an interior of the tubular.

Embodiment 20: The system of Embodiment 18, wherein the orifice plate comprises a plurality of flaps, wherein, in the first position, the flaps are positioned substantially perpendicular to a longitudinal axis of the tubular, wherein, in the second position, the flaps are positioned substantially parallel to the longitudinal axis.

The invention claimed is:

1. A method comprising:
   positioning a tubular within a wellbore formed in a subsurface formation, wherein a flow of fluid is to move through the tubular, wherein an orifice plate with a perforation of a specified geometry is positioned in the tubular, and wherein the orifice plate is movable between a first position and a second position after being positioned in the tubular to allow the perforation to alter a flow area of the flow of fluid moving through the tubular;
   detecting a change in a downhole attribute that changes in response to the alteration of the flow area of the flow of fluid; and
   determining a flow rate of the flow of fluid based on the detected change in the downhole attribute.

2. The method of claim 1, wherein the orifice plate is secured in the first position within a recess of the tubular using a dissolvable material.

3. The method of claim 2, wherein the orifice plate is to move to the second position after the dissolvable material dissolves, wherein the second position includes a path of the flow of fluid in an interior of the tubular.

4. The method of claim 3, wherein the orifice plate is to move to the second position by pushing the orifice plate into the path of the flow of fluid using at least one of a spring and a swellable polymer.

5. The method of claim 1, wherein the orifice plate has a first cross-sectional area after moving to the second position, wherein a path of the flow of fluid has a second cross-sectional area, wherein the first cross-sectional area is less than the second cross-sectional area.

6. The method of claim 5, wherein the orifice plate comprises a plurality of flaps, wherein, in the first position, the flaps are positioned substantially perpendicular to a longitudinal axis of the tubular, and wherein, in the second position, the flaps are positioned substantially parallel to the longitudinal axis.

7. The method of claim 6, wherein the orifice plate is to move from the first position to the second position in response to deploying a downhole tool, wherein the downhole tool pushes the flaps to the second position.

8. The method of claim 1, wherein detecting the change in the downhole attribute comprises detecting, with one or more sensors, a change in a property of the flow of fluid between a first location in the wellbore and a second location in the wellbore.

9. The method of claim 1, wherein the downhole attribute comprises at least one of a pressure variation, a temperature variation, an acoustic variation, a vibration, and a strain variation.

10. An apparatus comprising:
    an orifice plate with a perforation of a specified geometry to be positioned in a tubular within a wellbore, wherein the orifice plate is to move from a first position to a second position after being positioned in the tubular to allow the perforation to alter a flow area of a flow of fluid moving through the tubular,
    wherein a change in a downhole attribute that changes in response to the alteration of the flow area of the flow of fluid is detected, and wherein a flow rate of the flow of fluid is determined based on the detected change in the downhole attribute.

11. The apparatus of claim 10, wherein the orifice plate is to be secured in the first position within a recess of the tubular using a dissolvable material.

12. The apparatus of claim 11, wherein the orifice plate is to move to the second position after the dissolvable material dissolves, wherein the second position includes a path of the flow of fluid in an interior of the tubular.

13. The apparatus of claim 12, wherein the orifice plate is to move to the second position by pushing the orifice plate into the path of the flow of fluid using at least one of a spring and a swellable polymer.

14. The apparatus of claim 10, wherein the tubular is one of a tubing and a casing of the wellbore.

15. The apparatus of claim 10, wherein the orifice plate comprises a plurality of flaps, wherein, in the first position, the flaps are positioned substantially perpendicular to a longitudinal axis of the tubular, and wherein, in the second position, the flaps are positioned substantially parallel to the longitudinal axis.

16. The apparatus of claim 15, wherein the orifice plate is to move from the first position to the second position in response to deploying a downhole tool within the wellbore, wherein the downhole tool pushes the flaps to the second position.

17. The apparatus of claim 10, wherein the downhole attribute comprises at least one of a pressure variation, a temperature variation, an acoustic variation, a vibration, and a strain variation.

18. A system comprising:
an orifice plate with a perforation of a specified geometry to be positioned in a tubular of a wellbore, wherein the orifice plate is to move from a first position to a second position after being positioned in the tubular to allow the perforation to alter a flow area of a flow of fluid moving through the tubular;
at least one sensor to detect a change in a downhole attribute that is to change in response to the alteration of the flow area;
a processor; and
a computer-readable medium having instructions stored thereon that are executable by the processor to cause the system to,
determine a flow rate of the flow of fluid based on the detected change in the downhole attribute.

19. The system of claim 18, wherein the orifice plate is to be secured in the first position within a recess of the tubular using a dissolvable material, and wherein the orifice plate is to move to the second position after the dissolvable material dissolves, wherein the second position includes a path of the flow of fluid in an interior of the tubular.

20. The system of claim 18, wherein the orifice plate comprises a plurality of flaps, wherein, in the first position, the flaps are positioned substantially perpendicular to a longitudinal axis of the tubular, wherein, in the second position, the flaps are positioned substantially parallel to the longitudinal axis.

* * * * *